United States Patent [19]

Iwasaki et al.

[11] Patent Number: 5,774,099
[45] Date of Patent: Jun. 30, 1998

[54] LIQUID CRYSTAL DEVICE WITH WIDE VIEWING ANGLE CHARACTERISTICS

[75] Inventors: Shinichi Iwasaki; Hiroshi Kurihara; Yasuyuki Mishima; Masuyuki Ohta, all of Mobara, Japan

[73] Assignees: Hitachi, Ltd., Tokyo; Hitachi Device Engineering Co., Ltd., Chiba-ken, both of Japan

[21] Appl. No.: 630,619

[22] Filed: Apr. 10, 1996

[30] Foreign Application Priority Data

Apr. 25, 1995 [JP] Japan ..................................... 7-101240
Jul. 5, 1995 [JP] Japan ..................................... 7-169840

[51] Int. Cl.[6] .................................................. G02F 1/135
[52] U.S. Cl. .......................................................... 345/87
[58] Field of Search ........................... 345/92–100, 103, 345/208, 209, 87; 349/42–47

[56] References Cited

U.S. PATENT DOCUMENTS

| | | | |
|---|---|---|---|
| 4,385,292 | 5/1983 | Nonomura et al. | 340/719 |
| 4,869,576 | 9/1989 | Aoki et al. | 350/336 |
| 4,881,797 | 11/1989 | Aoki et al. | 350/339 |
| 5,159,476 | 10/1992 | Hayashi | 359/54 |
| 5,247,289 | 9/1993 | Matsueda | 345/98 |
| 5,434,686 | 7/1995 | Kanemori et al. | 359/59 |
| 5,459,483 | 10/1995 | Edwards | 345/98 |
| 5,519,521 | 5/1996 | Okimoto et al. | 359/59 |
| 5,537,129 | 7/1996 | Okada et al. | 345/90 |
| 5,598,180 | 1/1997 | Suzuki et al. | 345/100 |
| 5,598,285 | 1/1997 | Kondo et al. | 349/39 |
| 5,614,427 | 3/1997 | den Boer et al. | 437/40 |

*Primary Examiner*—Mark R. Powell
*Attorney, Agent, or Firm*—Antonelli, Terry, Stout & Kraus LLP

[57] ABSTRACT

A liquid crystal device for driving a liquid crystal by an electric field generally in parallel with a substrate plane. In this liquid crystal device, voltage waveforms having phases different by a half period are separately applied to even row common electrode lines 5 and odd row common electrode lines 6, so that the charging/discharging of the inline parasitic capacitance in the liquid crystal device, created at a polarity inversion time, are reduced to decrease the power consumption. In order to reduce the bluntness of a common electrode driving signal at a thin film transistor liquid crystal display panel, moreover, a common electrode driving unit includes differential signal superposing means for generating a differential signal and superposing it upon the common electrode driving signal.

11 Claims, 21 Drawing Sheets

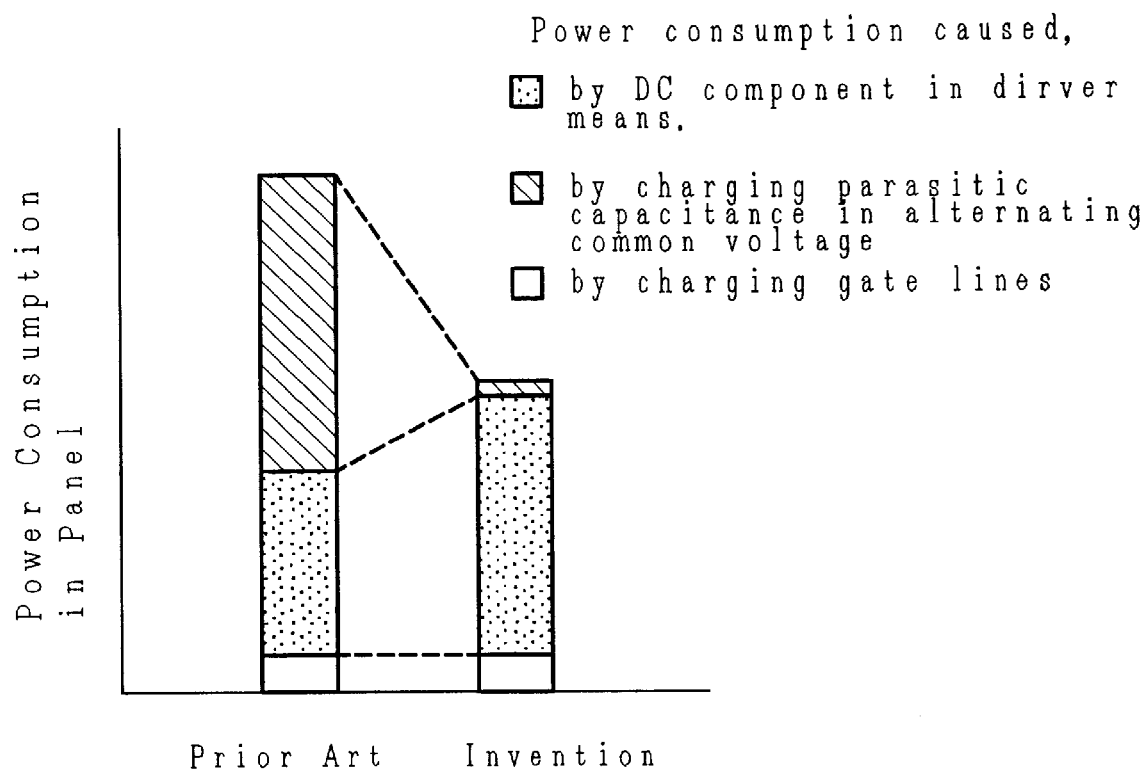

FIG. 15
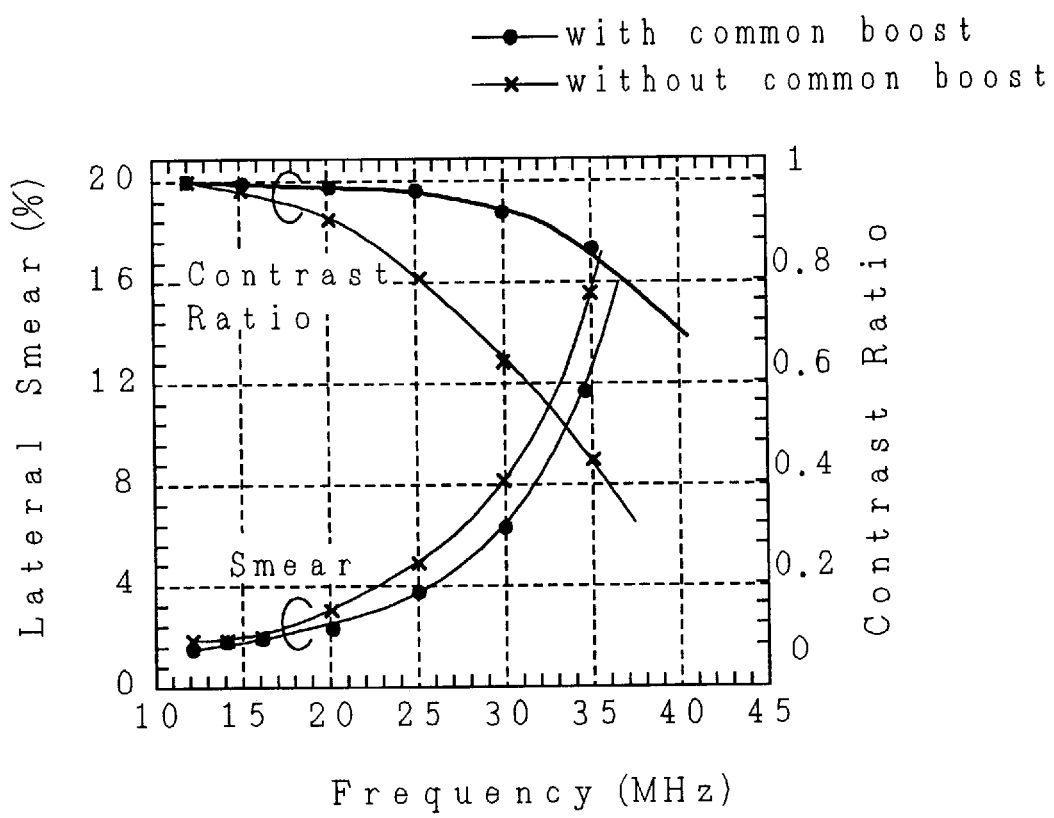
— • — with common boost
— × — without common boost
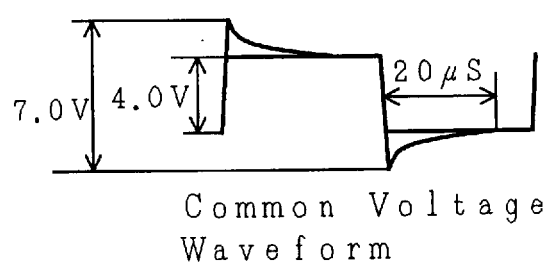
Common Voltage Waveform

FIG. 18
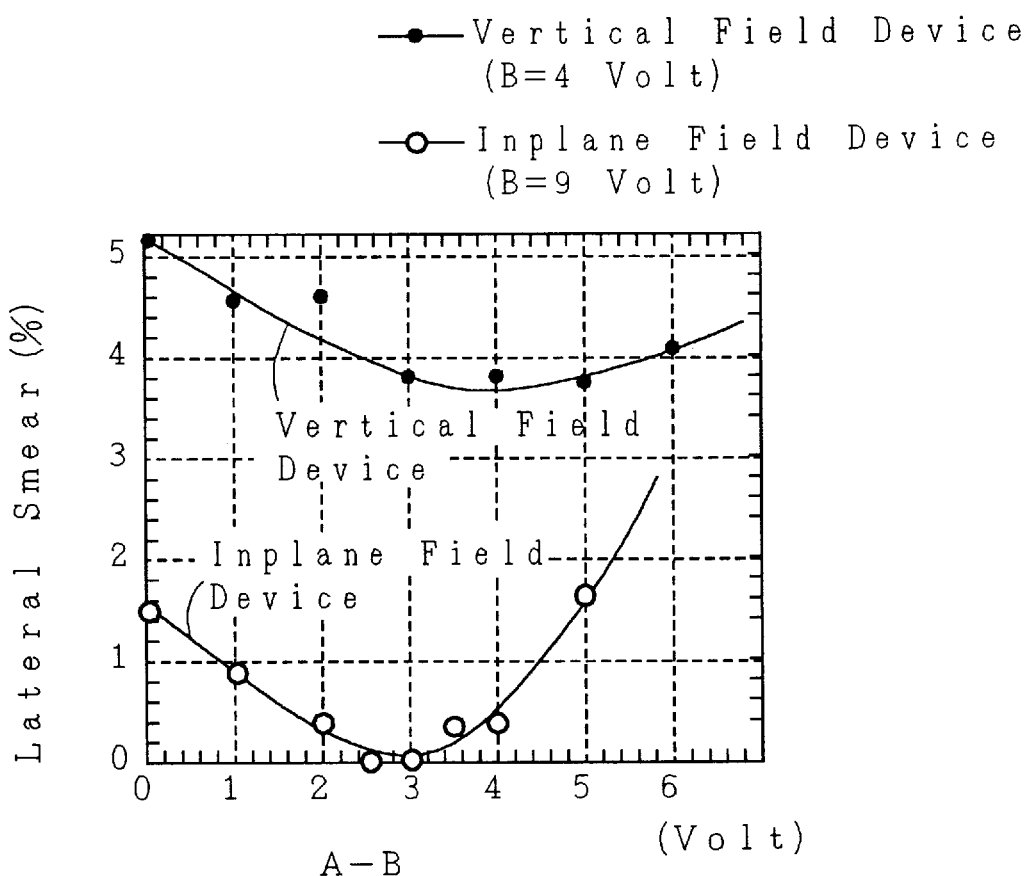
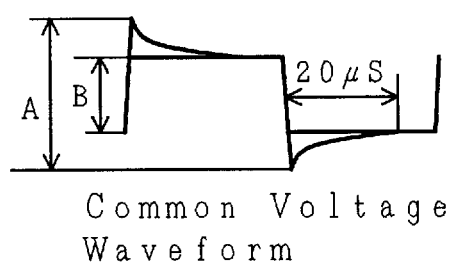
Common Voltage Waveform

LIQUID CRYSTAL DEVICE WITH WIDE VIEWING ANGLE CHARACTERISTICS

BACKGROUND OF THE INVENTION

1. Field of the Invention

The present invention relates to a liquid crystal device and, more particularly, to a high picture quality liquid crystal device with wide viewing angle characteristics which is driven at a low power consumption with little display irregularity when a voltage is applied to electrodes by a common voltage alternating drive method.

2. Description of the Prior Art

In a thin film transistor type liquid crystal device, the electrodes for driving the liquid crystal layer have been exemplified by the two transparent electrodes which are formed on a pair of substrates interface and are opposed to each other. The reason is that there is adopted the display system which is operated, as represented by the twisted nematic display system, by applying an electric field to the liquid crystal predominantly perpendicular to the surfaces of the substrates.

As the system in which the electric field is predominantly in parallel with the substrate surface and is applied to the liquid crystal, on the other hand, Japanese Patent Publication No. 21907/1988 has proposed the system using a comb-shaped electrode pair, which has not been put to practical use as the display device.

As the method of driving the TFT liquid crystal device of the prior art, moreover, Japanese Patent Laid-Open No. 913/1990 has proposed a system for driving the liquid crystal by changing the potentials of a common electrode and pixel electrodes to superpose and offset the potentials mutually. In order to reduce the flicker which is caused due to the asymmetry resulting from the field polarity, of the voltage waveforms to be applied to the liquid crystal, however, it is necessary to invert the polarity for every one horizontal interval.

FIG. 19 is a block diagram for explaining a schematic construction of the TFT liquid crystal device of the prior art. Numeral 70 designates a liquid crystal display panel (TFT-LCD); numeral 71 a display controller; numeral 72 a gate driver; and numerals 73-1 and 73-2 drain drivers.

In FIG. 19, the liquid crystal display panel 70 is composed of 640×3×480 dots, for example. Over and under the liquid crystal display panel 70, there are arranged the drain drivers 73-1 and 73-2 which are alternately connected with the drain lines (D) of the thin film transistors (TFT) fed with the voltage for driving the liquid crystal.

On the other hand, the gate lines (G) of the TFTs are connected with the gate drivers 72 which are arranged on the side face of the display panel 70 so that the gates of the TFTs are fed with the voltage for every horizontal interval. The display controller 71 composed of one semiconductor integrated circuit receives display data and display control signals from a host computer to drive the drain drivers 73-1 and 73-2 and the gate driver 72 on the basis of the data and the signals.

In this case, the display data from the host computer are transferred every unit time in units of data of one pixel, i.e., a group of red (R), green (G) and blue (B) data.

Here, the display data are composed of either twelve bits of four bits for each color or eighteen bits of six bits for each color.

Since the drain drivers 73-1 and 73-2 are arranged over and under the liquid crystal panel 70, the outputs for driving the drain drivers 73-1 and 73-2 from the display controller 71 are composed of two systems for both the control signals and the display data buses.

FIG. 20 is a block diagram for explaining a schematic construction of the drain driver of the TFT liquid crystal device of the prior art. Numeral 73 designates a drain driver; numeral 74 a data latch unit; and numeral 75 an output voltage generator.

As shown, the drain driver 73 is constructed of the data latch unit 74 for the display data and the output voltage generator 75.

Incidentally, the display data of 6 bits and the gradation reference voltages are inputted to the drain driver 73 from the outside so that the output voltage level takes sixty four levels.

The data latch unit 74 fetches the display data the amount of which corresponds to the number of outputs in synchronism with a display data latching clock signal (CL1) so that the output voltage generator 75 selects the output voltage corresponding to the display data from the data latch unit 74, out of the output voltages of sixty four gradations generated from the gradation reference voltages inputted from the outside, and outputs it to the drain signal lines. FIG. 21 is a circuit construction diagram of the output voltage generator of the drain driver of the TFT liquid crystal device of the prior art. Numeral 76 designates a decoder.

FIG. 21 shows a circuit construction of one circuit in the output voltage generator the number of which corresponds to the total number of the drain signal lines.

As shown in FIG. 21, the output voltage generator generates voltage values as shown in FIG. 2 ($VO_{00}$ to $V_{64}$), which are obtained by dividing each voltage among the gradation reference voltages ($V_0$ to $V_8$) inputted from the outside into eight, and the voltage values are selected and outputted by the decoder 76.

FIG. 22 is an explanatory diagram of the relation between the gradation reference voltages and the output voltage in FIG. 21. In FIG. 22, there can be obtained totally sixty five output voltage values, of which the voltage $V_{64}$ equal to $V_8$ is not used.

It is also known that a low withstand voltage drain driver can be used by using the common voltage alternating drive method of alternating the voltage to be applied to the common electrode, as the common electrode driving method of the TFT liquid crystal device.

It is further known that the viewing angle can be adjusted by changing the voltage to be applied between the common electrode and the pixel electrodes of the liquid crystals. In the TFT liquid crystal device of the prior art, the viewing angle is adjusted by changing the voltage to be applied to the drain signal lines.

The driving unit of the TFT liquid crystal device frequently uses a level shifter of differential amplifier type.

FIG. 24 is an exploded perspective view showing the individual components of a liquid crystal display module (MDL) of the prior art. Reference symbol SHD designates a frame-shaped shield case (or metal frame) made of a metal sheet; LCW a display window of the shield case; PNL a liquid crystal display panel; SPB a light diffusion plate; LCB a light guide; RM a reflecting plate; BL a back light; and LCA a back light case. These components are stacked, as shown, to assemble the module MDL.

This module is fixed as a whole by the pawls and hooks which are provided at the shield case SHD.

A driver unit board PCB1 is a driver unit board, on which a tape carrier package (TCP) having a liquid crystal driving IC chip packaged by the tape automated bonding (TAB) method and a capacitor are mounted, and is divided into two: the video signal driver unit (drain driver) and a scanning signal driver unit (gate driver).

On a driver unit board PCB2, there are mounted electronic parts including an IC, a capacitor and a resistor.

On this driver unit board PCB2, there are further mounted circuits including: a common electrode driving unit for the liquid crystal display panel PNL; a power circuit for establishing a plurality of stabilized voltage sources divided from one voltage source; and a circuit for transforming the data for a CRT (Cathode Ray Tube) from the host (or host operation unit) into the data for a thin film transistor liquid crystal device. On the other hand, this driver unit board PCB2 is equipped with the not-shown connector portion to be connected with the outside.

The back light case LCA is shaped to house the back light fluorescent lamp BL, the optical diffusion plate SPB, the optical conductor LCB and the reflecting plate RM so that the light of the back light fluorescent lamp BL arranged on the side face of the optical conductor LCB is transformed into a uniform back light on the display face by the optical conductor LCB, the reflecting plate RM and the optical diffusion plate SPB until it is emanated to the liquid crystal display panel PNL.

FIG. 23 is a circuit diagram showing a schematic construction of the common electrode driving unit of the prior art constructed of a common electrode driving voltage generator 219 and a common electrode driver 1001.

The common electrode driving voltage generator 219 outputs a trapezoidal wave, which has an amplitude of about 2.8 Volt or the total of the sum of the forward voltages of serially connected diodes 203 and 204 and the sum of the forward voltages of serially connected diodes 205 and 206, around a reference voltage VOP.

On the other hand, the common electrode driver 1001 outputs a trapezoidal wave, which is produced by amplyfying the output of the common electrode driving voltage generator 219 around the reference voltage VOP at an amplification factor determined by a resistor $R_1$ (208) and a resistor $R_2$ (209), i.e., $R_2 A(\omega)/(R_1+R_2+R_1 A(\omega))$, and feeds the common electrode driving voltage to the common electrode.

Here, $\omega$ is the angular frequency of the common electrode driving signal, and $A(\omega)$ is the gain of the operational amplifier when the signal of the angular frequency $\omega$ is inputted.

On the other hand, a thin film transistor liquid crystal display panel 101 uses an anisotropic conductive film 218 for connecting the output of the common electrode driver 1001 with the common electrode terminals formed on the thin film transistor side glass.

SUMMARY OF THE INVENTION

A first problem to be solved by the present invention is as follows.

In the aforementioned liquid crystal device of the prior art, the brightness will change greatly when the direction of viewing angle is changed. Especially when half tone display is made, there arises a practical problem that the gradation level is reversed depending upon the viewing angle direction.

If, on the contrary, there is adopted the system in which the direction of an electric field to be applied to the liquid crystal is predominantly in parallel with the substrate surface by using the comb-shaped electrode pair, the dependency of the brightness upon the viewing angle substantially disappears, as described by R. Kiefer, B. Weber, F. Windscheid and G. Baur on pp. 547 to 550 of "In-plane switching of Nematic Liquid Crystals" in Proceedings of the Twelfth International Display Research Conference of Japan Display 1992.

In this reference, however, no description is made upon the structure of the thin film transistor (TFT) and the drive method suited for the structure.

According to this construction, moreover, in order to maintain a sufficient optical transmissivity and a high contrast ratio, it is necessary to apply a high voltage of 8 Volt or more and to use a high withstand voltage drive IC having a high production cost and a power consumption.

In Japanese Patent Publication No. 21907/1988, on the other hand, there is proposed a structure in which the comb-teeth electrodes are connected with the thin film transistor. In this proposal, however, as many as seventeen comb-teeth electrodes are introduced into one pixel, and their electrode width has to be extremely narrowed to about 1 to 2 microns or less so that a sufficient pixel numerical aperture (e.g., 30% or more) may be maintained.

In order to increase the numerical aperture to a practical level and to apply a high electric field, it is necessary to introduce a number of extremely narrow electrodes thereby to make the paired electrode gaps as narrow as possible.

It is, however, very difficult to form thin lines evenly without any breakage all over the large-sized substrate.

A second problem in the drive method, as disclosed in Japanese Patent Laid-Open No. 913/1990, is that the waveform of the pulse voltage to be applied to the common electrode has to invert its polarity every horizontal interval, for which the parasitic capacitor in the substrate is repeatedly charged/discharged, so that the power consumption rises.

A third problem is that because of necessity for the polarity inverting time for every horizontal interval, the time to apply the voltage waveform varying with the video data is shortened and hence the element performance of the thin film transistor has to be improved.

A fourth problem is that in order to shorten the time period for the polarity inversion, the scale of the pulse generator is enlarged according to the instantaneous current which will rise at the inversion instant.

In the liquid crystal device of the prior art, moreover, all the pixels of the thin film transistor liquid crystal display panel 101 are driven by a single common electrode driver 1001. As a result, there arises a fifth problem of the so-called "waveform bluntness" that the common electrode drive signal is attenuated and distorted by the wiring resistance of the signal line from the output of the common electrode driving unit to the thin film transistor liquid crystal display panel, the connection resistance of the anisotropic conductive film 218, the wiring resistance of the common electrode line, and the capacitance the pixels connected with the common electrode line and the stray capacitance.

As a result, there is produced a phenomenum that the contrast ratio is lowered by the lowering of the writing percentage by the drop of the voltage difference between the drain electrodes and the common electrodes from a predetermined value, and that a streaky image, called lateral smear, is formed by the horizontal crosstalk of the screen, so that the visibility of the liquid crystal device drops.

The representatives of the invention to be disclosed herein will be briefly summarized in the following.

The means for solving the above-mentioned problems are as follows.

According to means 1, there is provided a liquid crystal device comprising: a liquid crystal sealed in between a pair of two substrates, at least one of which is transparent; pixels arranged in a matrix shape on one of the substrates and having thin film transistor elements, pixel electrodes connected with the source electrodes of the thin film transistors, and common electrodes; gate lines connected with the gate electrodes of the thin film transistors adjoining in each row; drain lines connected with the drain electrodes of the thin film transistors adjoining in each column; odd row common electrodes lines connected with the common electrodes in the individual odd rows; even row common electrode lines connected with the common electrodes in the individual even rows; an odd row common bus line connected with the odd row common electrode lines; an even row common bus line connected with the even row common electrode lines; and drive voltage applying means for applying voltage signal waveforms between the pixel electrodes and the common electrodes;

wherein the pixel electrodes and the common electrodes are so arranged as to apply electric fields having components parallel with the substrate plane between the pixel electrodes and the common electrodes by the drive voltage applying means, wherein the parallel electric field components are generated to drive the liquid crystal between the pixel electrodes and the common electrodes by applying voltage waveforms varying with video data to the pixel electrodes and pulse waveforms having binary amplitude levels to the common electrodes, and wherein the waveforms applied to the odd row common electrode lines and the even row common electrode lines by the drive voltage applying means have inverted phases to each other.

According to the means 1, moreover, there is provided means 2 wherein the pulse waveforms to be applied to the odd row common electrode lines and the even row common electrode lines have periods longer than two times of the horizontal interval.

According to the means 1, still moreover, there is provided means 3 wherein the odd row common bus line and the even row common bus line are made of a gate wiring material of the gate lines and a drain wiring material of the drain lines.

According to the means 1, furthermore, there is provided means 4 wherein the odd row common electrode lines and the even row common electrode lines are arranged generally in parallel with the gate lines in the pixel region, in which the pixels are individually arranged in the matrix shape, and wherein the odd row common electrode lines and the even row common electrode lines are individually gathered outside of the region and are connected with the odd row common bus line and the even row common bus line, respectively.

According to the means 4, furthermore, there is provided means 5 wherein the connection portions, in which the odd row common electrode lines and the even row common electrode lines are connected with the odd row common bus line and the even row common bus line, respectively, are arranged outside of the end portions of the gate lines, and are at the individually different gate line end portions.

According to means 6, there is provided a thin film transistor liquid crystal device comprising: a thin film transistor liquid crystal display panel having a plurality of thin film transistors in a matrix shape; and a common electrode driving unit for outputting a common electrode driving signal for driving the common electrode lines of the thin film transistor liquid crystal display panel, wherein the common electrode driving unit includes differential signal superposing means for generating a differential signal and superposing it upon the common electrode driving signal.

According to the means 1, furthermore, there is provided means 7 wherein the common electrode driving unit for outputting common electrode driving signals for driving the common electrode lines of the thin film transistor liquid crystal display panel, wherein the common electrode driving unit includes differential signal superposing means for generating a differential signal and superposing it upon the common electrode driving signals.

According to the means 7, furthermore, there is provided means 8 wherein the differential signal superposing means generates a differential signal for a period longer than two times of the horizontal interval and superposes the differential signal upon the common electrode driving signals.

According to the means 6, 7 or 8, furthermore, there is provided means 9 wherein the common electrode driving unit includes a feedback amplifier, and wherein the differential signal superposing means is an integrator including resistors and capacitors inserted into the feedback loop of the feedback amplifier.

According to the means 6, 7, or 8, furthermore, there is provided means 10 wherein the common electrode driving unit includes a feedback amplifier, and wherein the differential signal superposing means is an integrator including a wiring resistor of the signal line from the output of said common electrode driving unit to said thin film transistor liquid crystal display panel, and a wiring resistor of said common electrode line, and capacitors of a stray capacitor of the signal line from the output of said common electrode driving unit to said thin film transistor liquid crystal display panel and a stray capacitor of said common electrode line, inserted into the feedback loop of the feedback amplifier.

According to the aforementioned constructions of means 1 to 5, the following effects can be achieved.

FIGS. 9A to 9D are explanatory diagrams of the drive principles of the liquid crystal device of the present invention. FIG. 9A is a schematic diagram showing a portion of the section of a pixel when a drive voltage is applied; FIG. 9B is a schematic top plan view of FIG. 9A; FIG. 9C is a schematic diagram showing a portion of the section of a pixel when no drive voltage is applied; and FIG. 9D is a schematic top plan view of FIG. 9C.

In FIGS. 9A to 9D: numeral 17 designates a pixel electrode; numeral 25 a common electrode; numeral 28 a liquid crystal molecules; numeral 30 an aluminum film, numeral 31 a chromium film; numeral 32 a gate insulation film; numeral 33 an aluminum oxide film; numeral 35 a protective film, numeral 60 one of paired substrates; numerals 61-1 and 61-2 orienting films; numeral 62 the other of the paired substrates; and numeral 63 an electric field.

In FIG. 9A and FIG. 9B, the liquid crystal 28 sealed between the matrix substrate (or the lower substrate) 62 and the opposed substrate (or the upper substrate) 60 is so oriented by the orientation films 61-1 and 61-2 arranged on the upper and lower substrates 60 and 62 as to have a more or less angle, i.e., 45 degrees$\leq |\phi LC| < 90$ degrees with respect to the longitudinal direction of the pixel electrode 17 and the common electrode 25 when no drive voltage is applied.

The orientation of the liquid crystal on the interface between the upper and lower orientation films 61-1 and 61-2 is desirably parallel, i.e., $\phi LC1 = \phi LC2$, when the upper substrate has an orientation φLC1 and the lower substrate has an orientation +LC2. The liquid crystal 28 is assumed to have a positive dielectric constant anisotropy.

Here in FIG. 9C and FIG. 9D, different potentials are applied to the pixel electrode 17 composed of the aluminum film 30 and the chromium film 31 and the common electrode 25 composed of the aluminum film, to establish a potential difference inbetween, and the electric field 63 is applied to the liquid crystal 28. Then, the liquid crystal 28 reacts to change its direction of molecular axes to that of the electric field by the interaction between the dielectric constant anisotropy of the liquid crystal and the electric field 63.

At this time, the brightness is changed by the interaction between the anisotropy of the refractive index of the liquid crystal 28 and the not-shown polarizing plate mounted on the outer face of the substrate. This brightness depends especially upon the electric field 63 and changes with a slight difference of the field intensity. The brightness also becomes different depending upon the polarity of the voltage to be applied to the liquid crystal.

When the device is used as the matrix liquid crystal device, according to the aforementioned construction of the invention, the flickering due to the difference in the brightness resulting from the polarity of the applied voltage can be reduced by inverting the polarity of the voltage to be applied to the liquid crystal for every row.

FIGS. 10A to 10D are explanatory diagrams for comparing the method of applying the voltage to the liquid crystal in the liquid crystal device according to the present invention and the voltage applying method of the prior art. FIG. 10A is a waveform chart of the voltage application of the prior art; FIG. 10B is a conceptional diagram showing the relation between the odd rows, the even rows, and the common voltage polarities; FIG. 10C is a waveform chart of the voltage application of the present invention; and FIG. 10D is a conceptional diagram showing the relation between the odd rows, the even rows and the common voltage polarities.

In order to increase the field intensity, as shown in FIG. 10A and FIG. 10B, the inversions of the voltage waveforms of a pixel voltage Vd and a common voltage Vcom having inverted phases have to be executed, when applied to the pixel electrode 17 and the common electrode 25, for every selection of one row out of the m-th row to (m+4)-th row, as shown in FIG. 10B.

In the present invention, on the contrary, the voltage waveforms of the odd row common electrodes and the even row common electrodes are made different, i.e., Vcom1 and Vcom2 in FIG. 10C and FIG. 10D. As a result, the polarity of an applied voltage Vlc of the liquid crystal can be inverted even if constant voltage levels are individually applied to the common electrodes. Thus, according to the present invention, the polarity inverting period of the voltage applied to the liquid crystal can be prolonged, so that the charging/discharging of the parasitic capacitors between the lines in the liquid crystal device, produced at the voltage inversion time, can be decreased to reduce the power consumption.

According to the aforementioned constructions of means 6 to 10, the following effects can be achieved.

By the differential signal superposing means, the differential signal is superposed on the common electrode driving signal, so that a predetermined drive signal can be fed to the common electrodes even if the common electrode driving signal is attenuated by the wiring resistance of the signal line from the output of the common electrode driving unit to the thin film transistor liquid crystal display panel, the wiring resistance of the common electrode line, the capacitance of the pixels connected with the common electrode line, and the stray capacitance. As a result, it is possible to prevent the drop of the writing percentage which results from the fact that the difference in the potentials to be applied to the common electrodes and the pixel electrodes decreases and becomes smaller than a predetermined value and which causes the reduction of the contrast ratio and the occurrence of the lateral smear.

Furthermore, if the voltages to be applied to the odd row common electrode lines and the even row common electrode lines have inverted phases and have periods longer than two times of the horizontal interval, the less power consumption can be attained, in addition to that the reduction of the contrast ratio and the occurrence of the lateral smear can be prevented.

Furthermore, the common electrode driving unit includes the feedback amplifier, and the integrator having the resistor and the capacitor inserted into the feedback loop of the feedback amplifier. As a result, the output of the common electrode driving unit has a waveform in which the differential waveform of the integrator for eliminating the waveform bluntness is added to the output waveform produced by amplifying the input waveform to be applied to the input resistor.

Specifically, the time constant of the integrator is nearly equalized to that of the wiring resistance of the signal line from the output of the common electrode driving unit to the thin film transistor liquid crystal display panel, the wiring resistance of the common bus line and the common electrode line, the capacitance of the pixels connected with the common electrode lines, and the stray capacitance, so that a predetermined drive signal is applied to the common electrodes.

By driving the common electrodes of the thin film transistor liquid crystal display panel by the thus generated drive signal, it is possible to prevent the reduction of the contrast ratio and the occurrence of the lateral smear of the liquid crystal device.

Furthermore, the integrator to be inserted into the feedback loop of the feedback amplifier is constructed of the wiring resistance of the signal line from the output of the common electrode driving unit to the thin film transistor liquid crystal display panel, the wiring resistance of the common bus line and the common electrode line, the capacitance of the pixels connected with the common electrode line, and the stray capacitance, so that the waveform bluntness of the common electrode driving signals which are different for every liquid crystal display panels can be eliminated without adding any special circuit.

The foregoing and other objects, advantages, manner of operation and novel features of the present invention will be understood from the following detailed description when read in connection with the accompanying drawings.

BRIEF DESCRIPTION OF THE DRAWINGS

FIG. 8 is an explanatory diagram for comparing the power consumption reduction effect of the present invention with that of the prior art;

FIG. 15 is a graph showing the relation between the rate of occurrence of lateral smear and the drive frequency of the common electrode driving signal and the relation between the contrast ration and the drive frequency;

FIG. 18 is a graph showing the relation between the boost voltage and the rate of occurrence of lateral smear of the thin film transistor liquid crystal display panel of the prior art shown in FIG. 11, and the relation of the thin film transistor liquid crystal display panel of in-plane field type, as shown in FIG. 17;

DESCRIPTION OF THE PREFERRED EMBODIMENTS

The present invention will be described in detail in connection with its embodiments with reference to the accompanying drawings.

EMBODIMENT 1

Figure 1:
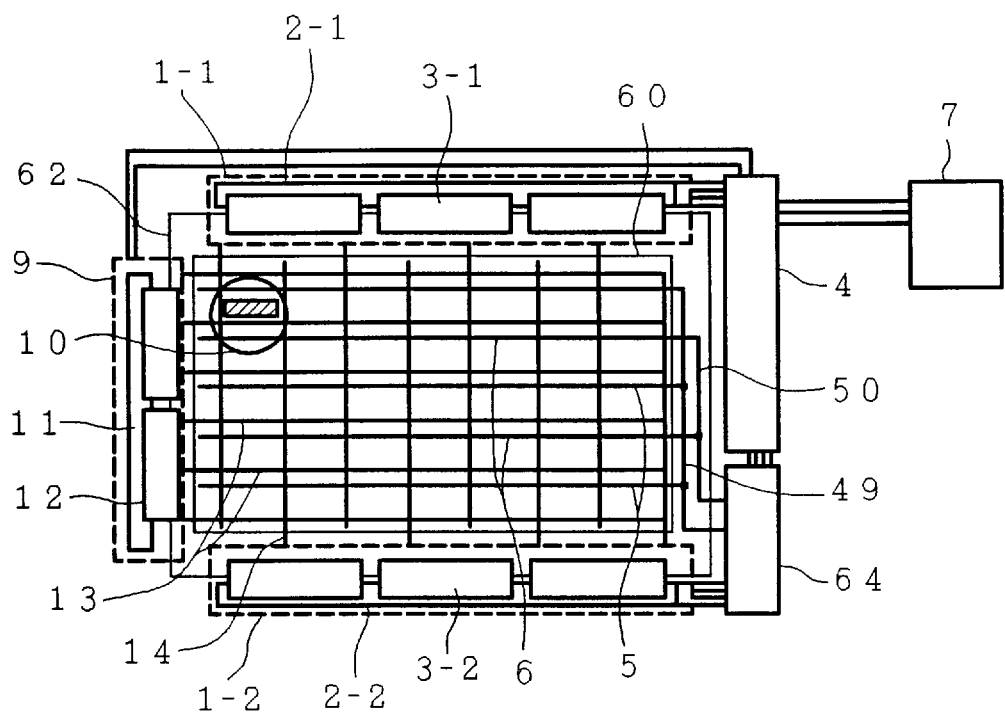
FIG. 1 is a conceptional diagram for explaining the construction of Embodiment 1 of a liquid crystal device according to the present invention.

FIG. 1 is a conceptional diagram for explaining the construction of a liquid crystal device according to the present invention. Symbols 1-1 and 1-2 designate drain driver units; 2-1 and 2-2 drain wiring board; 3-1 and 3-2 drain driver ICs; 4 a display timing controller; 5 even row common electrode lines; 6 odd row common electrode lines; 7 a video signal source; 9 a gate driver unit; 10 pixels; 11 a gate wiring board; 12 a gate driver IC; 13 gate lines; 14 drain lines; 49 an even row common bus line; 50 an odd row common bus line; 60 an opposed substrate; 62 a matrix substrate; and 64 a power circuit.

The liquid crystal device, as shown, is constructed of the components including the matrix substrate 62 having the pixels 10 in a matrix shape, the opposed substrate 60, the display timing controller 4, the drain driver units 1-1 and 1-2, the gate driver unit 9, the power circuit 64, and the liquid crystal sealed in between the matrix substrate 62 and the opposed substrate 60, although not shown.

In the matrix substrate 62, moreover, the drain lines 14 and the gate lines 13 for feeding drive voltages necessary for driving the pixels 10 are so arranged at right angles as to enclose the pixels 10.

And, the drain lines 14 are connected with the drain driver units 1-1 and 1-2 whereas the gate lines 13 are connected with the gate driver unit 9. Still moreover, the odd row common electrode line 6 is connected with the odd row pixels, and the even row common electrode line 5 is connected with the even row pixels. Furthermore, the odd row common electrode line 6 and the even row common electrode line 5 are connected with the power circuit 64 through the odd row common bus line 50 and the even row common bus line 49, respectively. In the present embodiment, the uppermost line is a dummy line so that it is arranged out of the display area.

Thanks to this construction, the pixels in the odd and even rows are fed with different drive voltages.

On the other hand, the drain driver units 1-1 and 1-2 are constructed of the drain driver ICs 3-1 and 3-2 and the drain wiring boards 2-1 and 2-2, and connected with the power circuit 64 and the display timing controller 4.

The display timing controller 4 fetches video signals and timing signals from the external video signal source 7, transforms them into video signals for the drain driver ICs 3-1 and 3-2 and their timing signals, and feeds the transformed video signals and timing signals to the drain driver ICs 3-1 and 3-2 through the drain wiring boards 2-1 and 2-2.

These drain driver ICs 3-1 and 3-2 generate the drive voltages corresponding to the video signals by using the gradation reference voltages from the power circuit 64, and feed them to the drain lines 14 in response to the timing signals.

The gate driver unit 9 is constructed of the gate driver IC 12 and the gate wiring board 11 and connected with the power circuit 64 and the display timing controller 4. The gate driver IC 12 fetches the timing signals fed from the display timing controller 4 through the gate wiring board 11, generates the drive signals, and feeds the drive signals to the gate lines 13.

As a result, the pixels 10 in the matrix substrate 62 can be sequentially fed with the drain voltages corresponding to the video signals.

Here will be described the structure of the pixels constituting the liquid crystal device thus far described.

Figure 2:
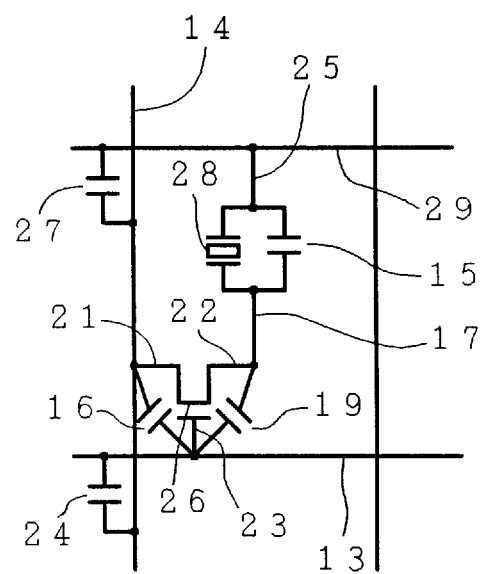
FIG. 2 is an equivalent circuit diagram of a pixel in Embodiment 1 of the liquid crystal device according to the present invention.

FIG. 2 shows an equivalent circuit of a pixel in one embodiment of the liquid crystal device according to the present invention. Numeral 13 designates the gate line; 14 the drain line; 15 a storage capacitor; 16 a parasitic capacitor (Cgd); 17 a pixel electrode; 19 a parasitic capacitor (Cgs); 21 a drain electrode; 22 a source electrode; 23 a gate electrode; 24 a gate/drain cross capacitor; 25 a common electrode; 26 a thin film transistor (TFT); 27 a common drain cross capacitor; 28 a liquid crystal; and 29 a common electrode line.

In FIG. 2, the pixel 10 is constructed of the thin film transistor 26, the pixel electrode 17, the common electrode 25, the storage capacitor 15, and the liquid crystal 28 between the pixel electrode 17 and the common electrode 25.

The gate electrode 23, the drain electrode 21 and the source electrode 22 of the thin film transistor 26 are connected with the gate line 13, the drain line 14 and the pixel electrode 17, respectively.

Moreover, the common electrode 25 is connected with the row common electrode line 29, and the storage capacitor 15 is formed between the common electrode 25 and the pixel electrode 17. In addition, the liquid crystal 28 is sealed in between the matrix substrate 62 and the opposed substrate 60, as described with reference to FIG. 1, and is arranged between the common electrode 25 and the pixel electrode 17.

At the intersections between the gate line 13 and the drain line 14 and between the common electrode line 29 and the drain line 14, respectively, there are the gate/drain cross capacitor 24 and the common drain cross capacitor 27. In the thin film transistor 26, on the other hand, there are formed the parasitic capacitor (Cgs) 16 and the parasitic capacitor (Cgd) 19.

Figure 3A:
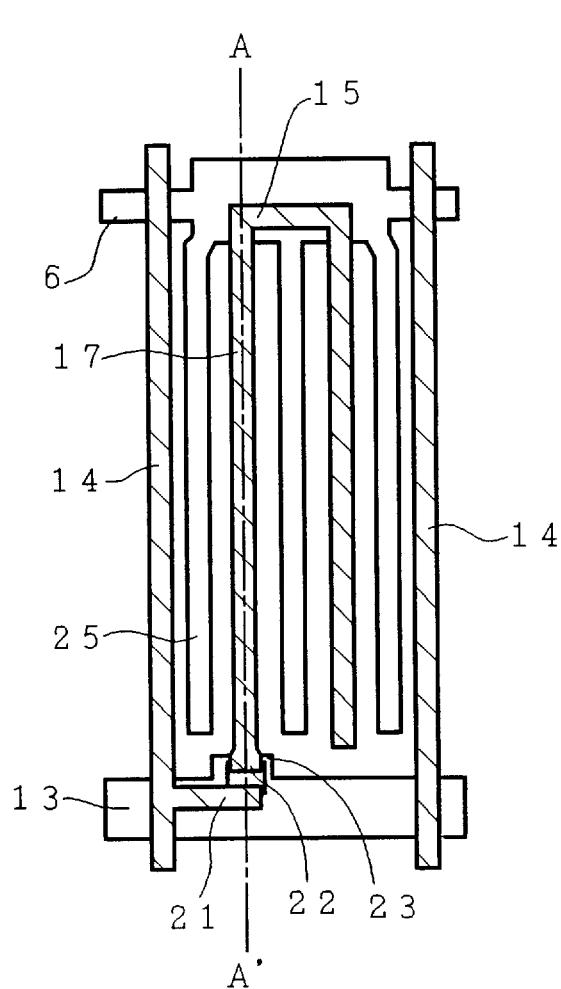
FIGS. 3A and 3B are structural diagrams of one pixel portion in Embodiment 1 of the liquid crystal device according to the present invention.
Figure 3B:
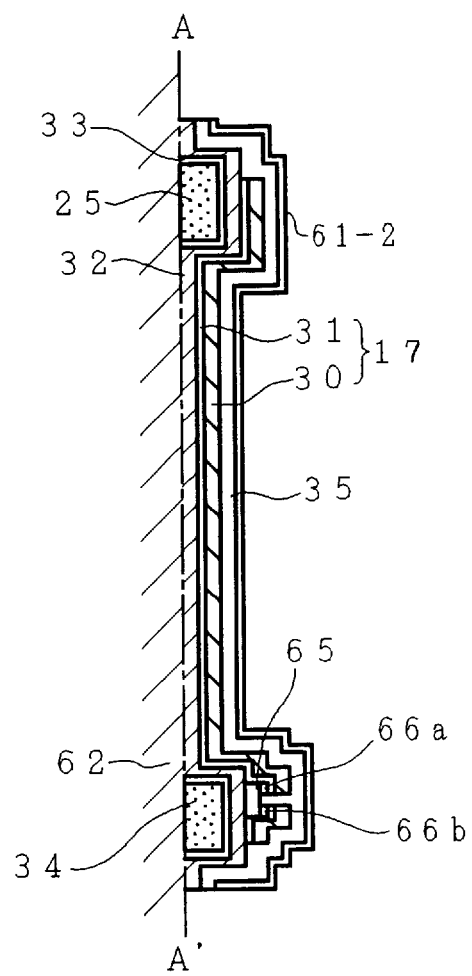

FIGS. 3A and 3B are structural diagrams of one pixel portion of Embodiment 1 of the liquid crystal device according to the present invention. FIG. 3A is a top plan view, and FIG. 3B is a section taken along the line A—A' of FIG. 3A.

In FIGS. 3A and 3B, numeral 6 designates the odd row common electrode line, 13 the gate line; 14 the drain line; 15 the storage capacitor; 17 the pixel electrode; 21 the drain electrode; 22 the source electrode; 23 the gate electrode; 25 the common electrode; 30 an aluminum film; 31 a chromium film; 32 a gate insulation film; 33 aluminum oxide; 35 a protective film; 61-2 an orientation film; 62 the matrix substrate; 65 a semiconductor layer; and 66a and 66b ohmic layers.

In FIGS. 3A and 3B, the gate electrode 23 and the common electrode 25 are formed of aluminum, for example, over the matrix substrate 62. Moreover, the gate line 13 and the row common line are simultaneously formed. The gate electrode 23 is electrically connected to the gate line 13, and the common electrode 25 is electrically connected to the odd row common line 6.

Next, the aluminum oxide 33 is formed by anodization, and the gate insulation film 32 is then formed of silicon nitride, for example. Moreover, the semiconductor layer 65 of hydrogenated amorphous silicon, for example, is formed over the portion, opposed to the gate electrode 23, of the gate insulation film 32. Over the semiconductor layer 65, there are further formed the ohmic layers 66a and 66b which are made of N-type hydrogenated amorphous silicon and electrically isolated from each other.

Moreover, the source electrode 22, the drain electrode 21, the pixel electrode 17 and the drain line 14 are simultaneously composed of the two layers of the chromium film 31 and the aluminum film 30, for example, and the source electrode 22 is electrically connected to the pixel electrode 17, and the drain electrode 21 is electrically connected to the drain line 14.

At this time, the common electrode 25 has three comb teeth whereas the pixel electrode 17 has two comb teeth, for example, and these electrodes 25 and 17 are so arranged in the pixel 10 generally in parallel with the drain line 14 that their comb teeth are regularly spaced alternately.

The storage capacitor 15 is formed through the gate insulation film 32 at the overlapping area between the common electrode line 6 and the pixel electrode 17. There are further formed the protective film 35 of silicon nitride or the like and the oriention film 61-2 of polyimide or the like.

FIGS. 3A and 3B show the structure of the pixel 10 in an odd row. However, the pixel 10 in an even row has a similar structure except that the common electrode 25 is connected with the even row common electrode line 5 (see FIG. 1) in place of the odd row common electrode line 6.

In the present embodiment, the active element is an amorphous silicon thin film transistor 26 (FIG. 2) but may otherwise be a poly-silicon thin film transistor, a MOS transistor on a silicon wafer, or a two-terminal element such as an MIM (Metal-Insulator-Metal) diode.

The materials of the individual electrodes and the individual lines are not especially limited, but highly corrosion-resistant metals are desirably used when corrosion at the terminal portions where they are connected with the driver units are taken into consideration.

In the present embodiment, moreover, one thin film transistor is used for one pixel, but two or more thin film transistors may be used for redundancy.

Incidentally, in the present embodiment, the numbers of comb teeth of the common electrode 25 and the pixel electrode 17 are three and two, respectively, but are desirably as small as possible when the numerical aperture or the like is taken into consideration.

Figure 4A:
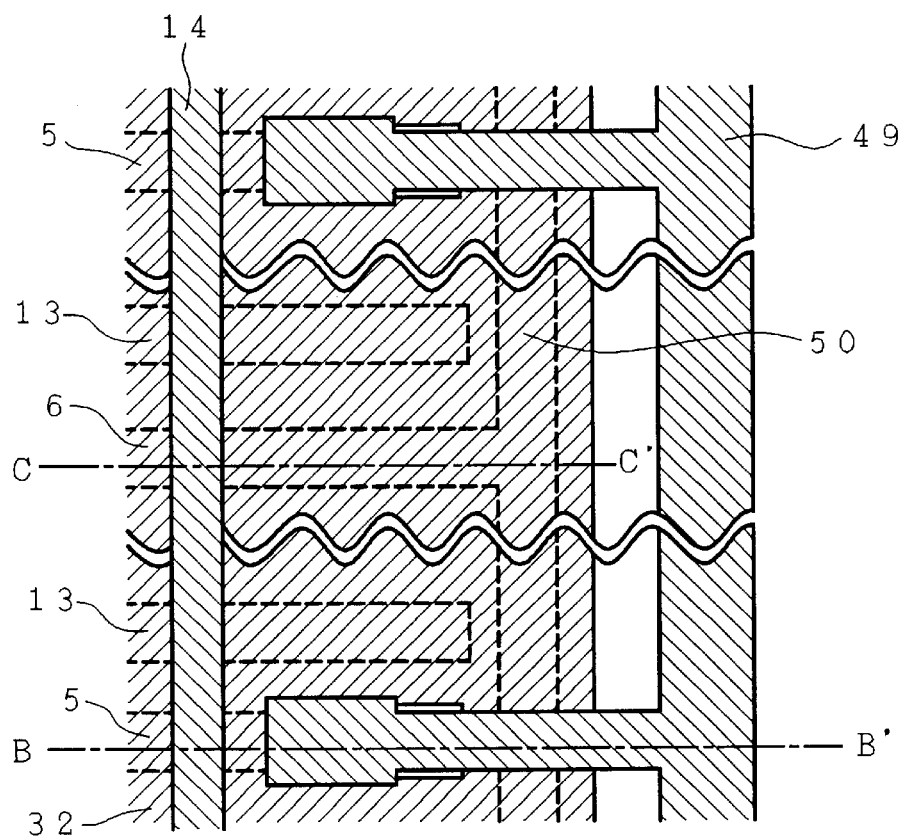
FIGS. 4A to 4C are explanatory diagrams of the structure between common electrode lines and common bus lines in Embodiment 1 of the liquid crystal device according to the present invention.
Figure 4B:
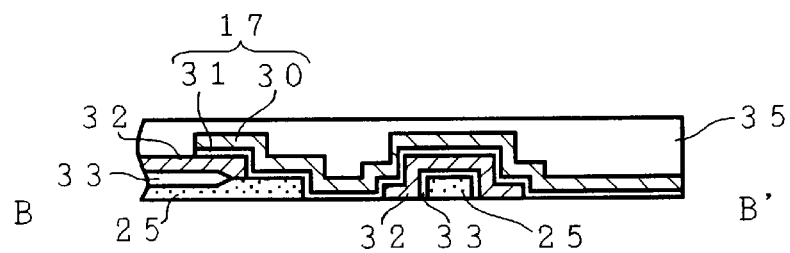
Figure 4C:
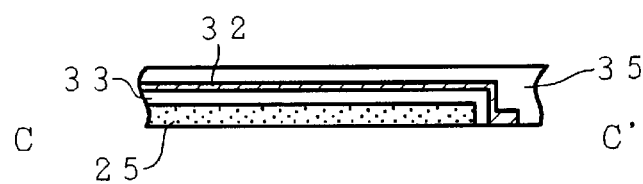

FIGS. 4A to 4C are explanatory diagrams of the structure of the connection portions among the common electrodes and the common bus lines of one embodiment of the liquid crystal device according to the present invention. FIG. 4A is a top plan view; FIG. 4B is a section taken along line B—B' of FIG. 4A; and FIG. 4C is a section taken along line C—C' of the same.

In the present embodiment, there are shown the constructions of the odd row common electrode lines 6 and the even row common electrode lines 5 at the wiring end portions of the gate lines 13, where the gate drive IC 12 is not connected.

In FIGS. 4A to 4C, all the odd row common electrode lines 6 are connected with the odd row common bus line 50, and all the even row common electrode lines 5 are electrically connected with the even row common bus line 49. These individual bus lines 49 and 50 are connected with the power circuit 64 (FIG. 1).

In the odd row common bus line 50, the odd row common electrode lines 6 are formed of an aluminum film at a time and are then anodized to form the aluminum oxide film 33.

On the other hand, the end portions of the even row common electrode lines 5 are covered with the not-shown resist film before the anodization to prevent any aluminum oxide film 33 from being formed.

Next, the gate insulation film 32 is formed except for the end portions of the even row common electrode lines 5. Moreover, the chromium film 31 and the aluminum film 30 are used to form the drain line 14. Simultaneously with this, the even row common bus line 49 is formed.

At this time, the even row common bus line 49 is so formed as to cover the end portions of the even row common electrode lines 5, so that it is electrically connected with the even row common electrode lines 5. At last, the protective film 35 is formed.

In the present embodiment, the even row common bus line 49 is formed by using only the same chromium film and aluminum film as those of the drain line 14. However, the gate line 13 may be made of the same wiring material 34 as of the drain line 14.

Moreover, the even row and odd row bus lines 49 and 50 may be interchangeably formed.

Figure 5A:
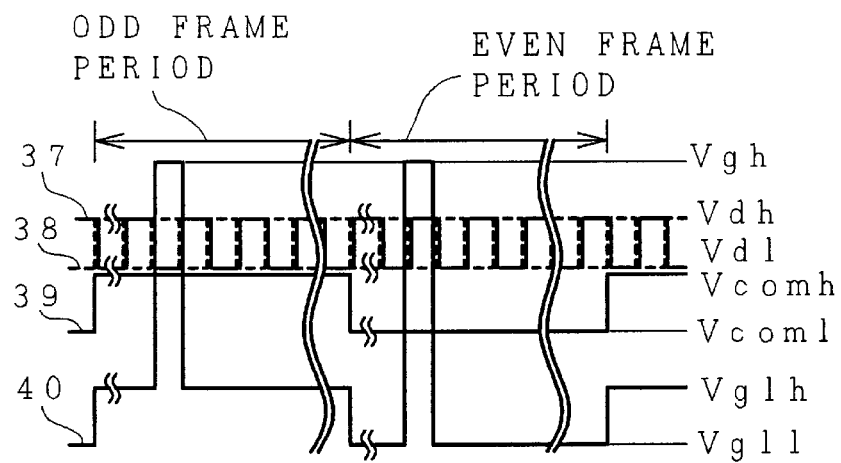
FIGS. 5A to 5D are examples of driving voltage waveform diagrams when the pixels of odd and even rows in the liquid crystal device according to the present invention are driven.
Figure 5B:
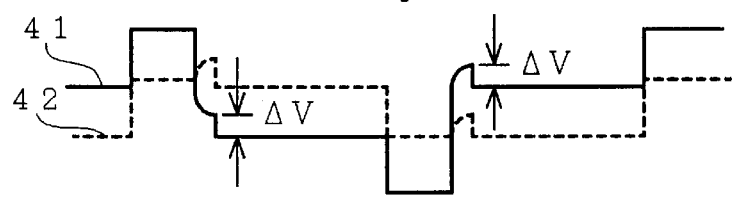

FIGS. 5A to 5D are waveform diagrams showing drive voltages when odd row and even row pixels in the liquid crystal device according to the present invention are driven. FIGS. 5A and 5B are drive voltage waveform diagrams of the case in which an electric field is applied to the odd row liquid crystal 28, and FIGS. 5A and 5B are drive voltage waveform diagrams of the case in which an electric field is applied to the even row liquid crystal 28.

Here, numeral 37 designates an odd row drain voltage at the time of application of an electric field; 38 an odd row drain voltage at the time of no application of an electric field; 39 an odd row common voltage; 40 an odd row gate voltage; 41 an odd row pixel voltage at the time of application of an electric field; 42 an odd row pixel voltage at the time of no application of an electric field; 43 an even row drain voltage at the time of no application of an electric field; 44 an even row drain voltage at the time of application of an electric field; 45 an even row common voltage; 46 an even row gate voltage; 47 an even row pixel voltage at the time of no application of an electric field; and 48 an even row pixel voltage at the time of application of an electric field.

When an electric field is applied to the odd row liquid crystal 28, as shown in FIGS. 5A and 5B, the gate voltage 40, the drain voltage 37 and the odd row common voltage 39 are applied to the gate electrode 23, the drain electrode 21 and the common electrode 25, respectively.

When the gate voltage 40 changed from Vglh to Vgh for an odd frame period, the thin film transistor 26 is turned on to apply the drain voltage 37 at Vdl to the pixel electrode 17 through the source electrode 22 and the differential voltages between the level Vcomh of the common voltage 39 and the level Vdl to the liquid crystal 28.

When the gate voltage changes from Vgh to Vglh and consequently the thin film transistor 26 is turned off, the odd row pixel voltage 41 drops from the level Vdl by a voltage drop ΔV resulting from the combined capacitance of the parasitic capacitance (Cgs) 19 of the thin film transistor 26, the storage capacitance (Cstg) and the capacitance component (Clc) of the liquid crystals 28. While the thin film transistor 26 is off, the differential voltage between the pixel voltage level (Vdl-ΔV) and the level Vcomh is continuously applied to the liquid crystal 28.

When an even frame period comes, the odd row common voltage 39 is inverted in polarity from Vcomh to Vcoml. Simultaneously with this, the gate voltage 40 changes from Vglh to Vgll.

The change (Vglh-Vgll) of the gate voltage 40 and the change (Vcomh-Vcoml) of the gate voltage 40 are equalized not to change the voltage applied to the liquid crystal.

For the even frame period, the gate voltage 40 is changed from Vgll to Vgh to turn on the thin film transistor thereby to apply the drain voltage 37 at the level Vdh, different from that for the off frame period, to the pixel electrode 17 and the differential voltage between Vdh and Vcoml to the liquid crystal 28.

For the OFF period of the thin film transistor 26 at the time of change of the gate voltage 40 from Vgh to Vgll, on the other hand, the differential voltage between (Vdh-ΔV) and Vcoml is applied to the liquid crystal 28.

As a result, the liquid crystal 28 is driven by the electric field which is generated by the voltage applied to render the thin film transistor 26 off because the OFF period of the thin film transistor 26 is sufficiently longer than the ON period.

When no electric field is applied to the odd row liquid crystal 28, as shown in FIGS. 5A and 5B, the drain voltage 38 is applied. For the odd frame period, the level Vdh is applied as the voltage level of the drain voltage 38 to the pixel electrode 17. For the even frame period, the level Vdl is applied as the drain voltage to the pixel electrode 17.

As a result, the differential voltage between the common voltage 39 and the pixel voltage 42 is decreased, and hence no electric field is applied to the liquid crystal 28.

Figure 5C:
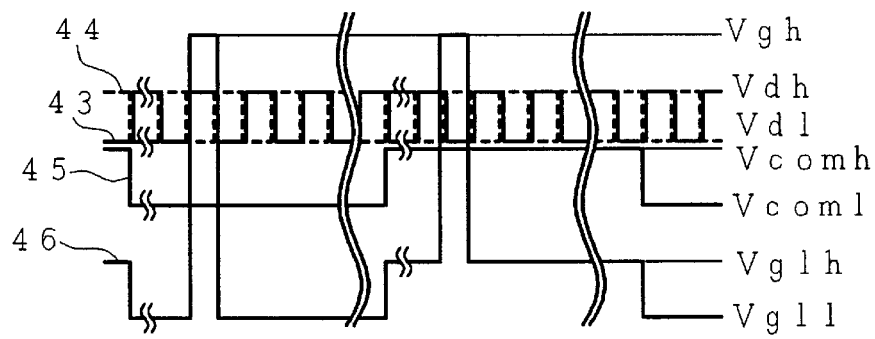
Figure 5D:
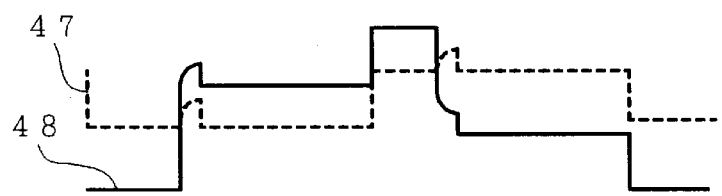

When an electric field is applied to the even row liquid crystal 28, as shown in FIGS. 5C and 5D, the gate voltage 46, the drain voltage 43 and the even row common voltage 45 are applied to the gate electrode 23, the drain electrode 21 and the common electrode 25, respectively.

The voltage waveforms for the odd frame period and for the even frame period are merely interchanged between the gate voltage 46 and the gate voltage 40, between the drain voltage 43 and the drain voltage 37, between the odd row common voltage 39 and the even row common voltage 45, and between the odd row pixel voltage 41 and the even row pixel voltage 47, but the method of applying the electric field to the liquid crystals 28 is the same in the other points.

When no electric field is applied to the even row liquid crystals 28, as shown in FIGS. 5C and 5D, the drain voltage 44 is applied. The voltage waveforms for the odd frame period and for the even frame period are also merely interchanged between the drain voltage 44 and the drain voltage 38, but the method of applying the electric field is the same in the other points.

As a result, a liquid crystal device having little flicker can be provided by using the substrate construction and the drive method of the present embodiment, even if the inversion period of the common voltage applied to the common electrode is prolonged.

EMBODIMENT 2

Figure 6:
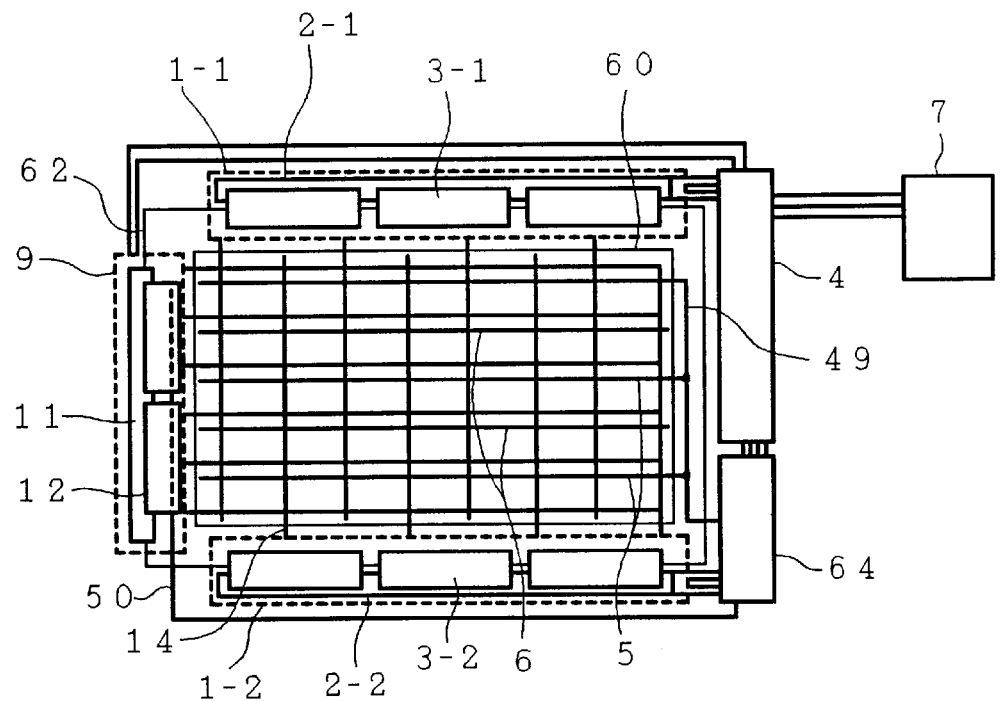
FIG. 6 is a conceptional diagram for explaining Embodiment 2 of the liquid crystal device according to the present invention.

FIG. 6 is a conceptional diagram for explaining another embodiment of the liquid crystal device according to the present invention. Numeral 49 designates an even row common bus line, and 50 designates an odd row common bus line. The same reference numerals as those of FIG. 1 designate the identical portions.

The present embodiment is similar to the foregoing Embodiment 1 except for the points described in the following.

In FIG. 6, the even row common electrode lines 5 are connected with the even row common bus line 49 at their terminals which are not connected with a gate IC 12. The odd row common electrode lines 6 are connected with the odd row common bus line 50 at their terminals which are connected with the gate IC12. The odd row common bus line 50 is connected with the power circuit 64 through the gate driver unit 9 or the drain driver units 1-1 and 1-2.

Figure 7:
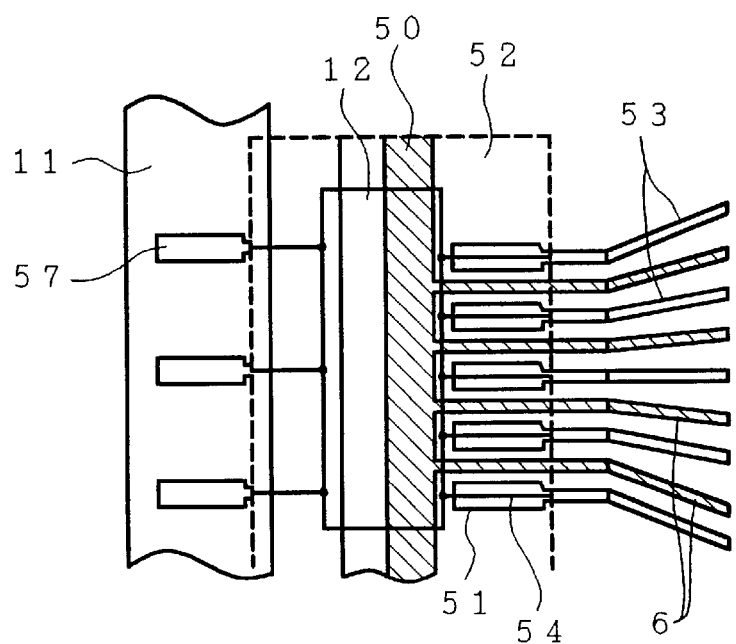
FIG. 7 is an explanatory diagram of the connection portion of even row common electrode lines and an even row common bus line on the side where a gate driver IC and a gate line in Embodiment 2 are connected.
Figure 9A:
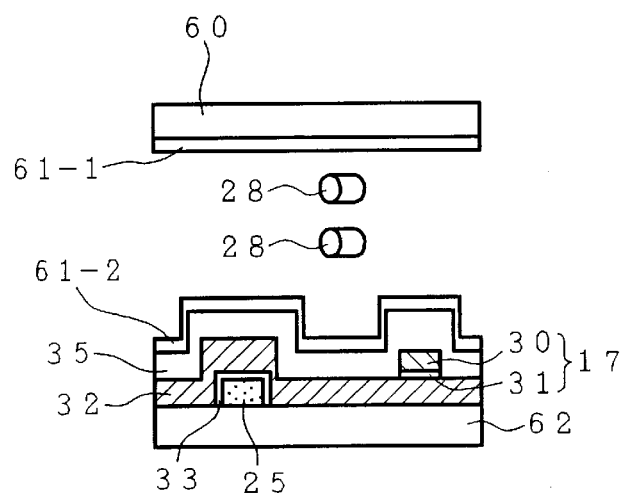
FIGS. 9A to 9D are explanatory diagrams of the driving principle in the liquid crystal device of the present invention.
Figure 9C:
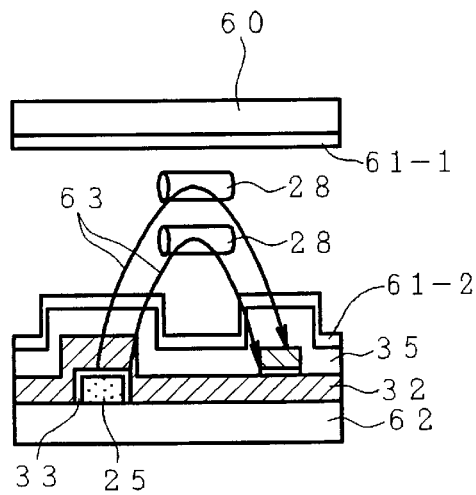
Figure 9B:
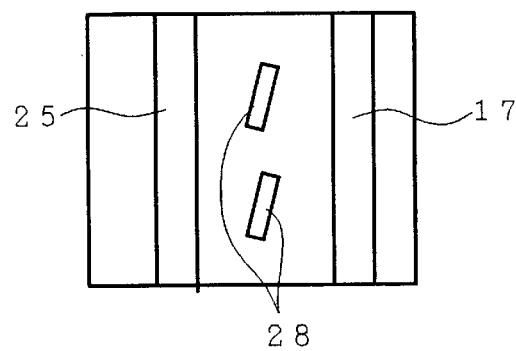
Figure 9D:
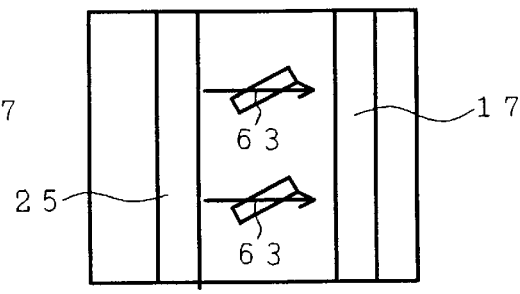
Figure 10A:
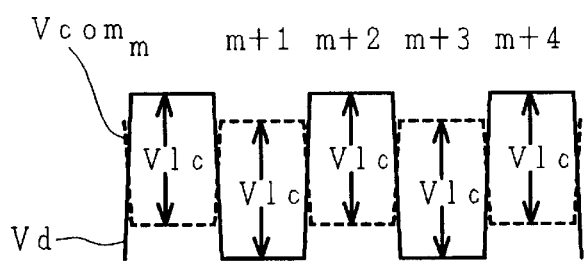
FIGS. 10A to 10D are explanatory diagrams for comparing the method of applying voltages to a liquid crystal in the liquid crystal device of the present invention with the voltage applying method of the prior art.
Figure 10B:
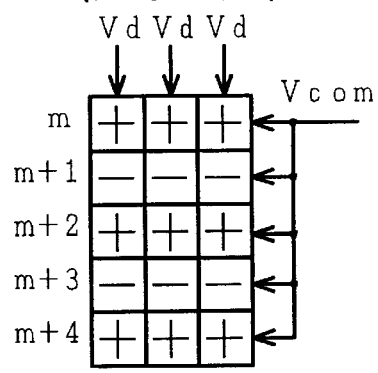
Figure 10C:
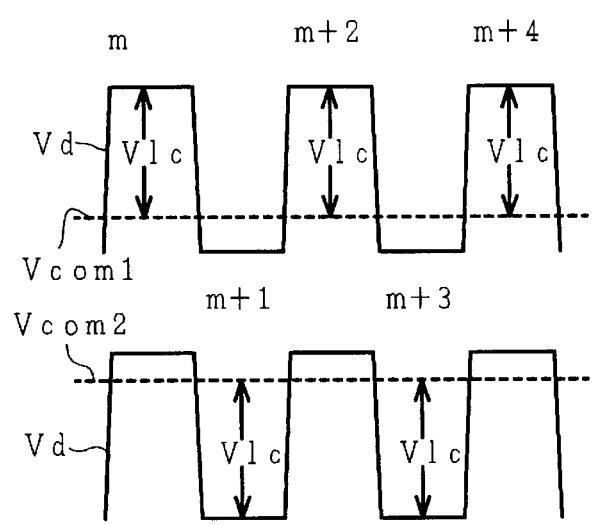
Figure 10D:
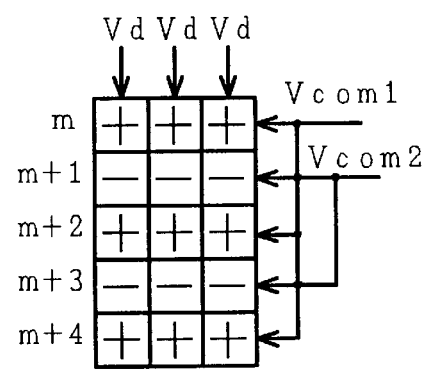

FIG. 7 is an explanatory diagram of the connection portion between the odd row common electrode lines 6 and the odd row common bus line 50 on the side where the gate driver IC and the gate line in Embodiment 2 described with reference to FIG. 6, are connected. Numeral 11 designates a gate wiring substrate; 12 a gate driver IC; 50 an odd row common bus line; 54 a gate IC output terminal; 52 a TCP (Tape Carrier Package); 53 a gate line; 51 a connection terminal; and 57 a gate IC input terminal. At the end portions of the individual gate lines 53, as shown in FIG. 7, there are individually formed the connection terminals 51, which are connected by an ACF (Anisotropic Conductive Film) with the IC output terminals 54 of the TCP (Tape Carrier Package) having the gate IC 12 and its electrode pattern on the tape-shaped base film.

Moreover, the IC input terminals 57 of the TCP 52 are soldered to the gate wiring board 11 and fed with the individual signals from the gate wiring board 11.

Still moreover, the individual odd row common electrode lines 6 are connected with the odd row common bus line 50 by being extended outside of the gate terminals 51. These odd row common bus line 50 and odd row common bus line 6 are simultaneously formed of the same wiring material as that of the even row common electrode line and the even row common bus line of the foregoing embodiment 1.

By using the present embodiment, the odd row common bus line and the odd row common electrode lines can be simultaneously formed to reduce fault connection of the lines greately.

In addition, it is possible to eliminate the parasitic capacitances at the intersections between the even row common electrode lines 5 and the odd row common bus line 50.

EMBODIMENT 3

Figure 11:
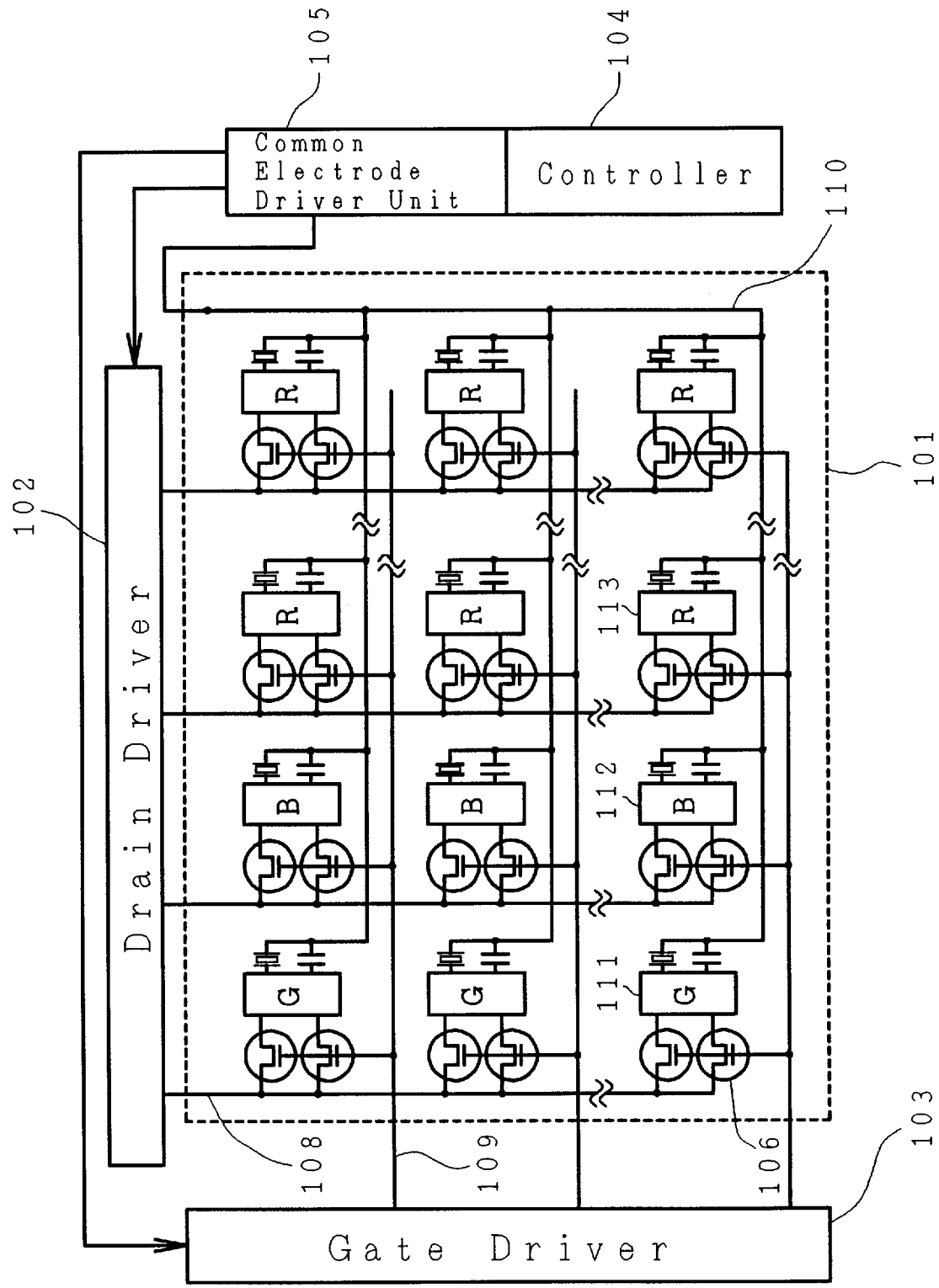
FIG. 11 is a block diagram showing a schematic construction of a liquid crystal device of Embodiment 3 of the present invention.

First of all, a common electrode driving unit means of Embodiment 3 is shown in FIG. 11, which is used in a thin film transistor liquid crystal device.

In FIG. 11, 101 designates a thin film transistor liquid crystal display panel (TFT-LCD); 102 a drain driver; 103 a gate driver; 104 a controller (display control unit); 105 a common electrode driving unit; 106 a thin film transistor (TFT); 108 drain lines; 109 gate lines; 110 a common electrode line; 111 a green pixel; 112 a blue pixel; and 113 a red pixel.

In the thin film transistor liquid crystal device, as shown in FIG. 11; the drain driver 102 mounted with the drain driver unit is provided on the upper side of the thin film liquid crystal display panel 101; the gate driver 103 mounted with the gate driver unit is provided on one side portion; and the controller 104 and the common electrode driving unit 105 are arranged on the opposite side portion to the gate driver 103.

The drain driver 102, the gate driver 103, the controller 104 and the common electrode driving unit 105 are mounted on their respective dedicated printed board.

The output of the drain driver 102 is connected with the drain lines 108 which are connected with the drain terminals of the thin film transistors 106, and the output of the gate driver 103 is connected with the gate lines 109 which are connected with the gate terminals of the thin film transistors 106.

According to the control signals inputted from a not-shown data processor into the controller 104, the ON/OFF of thin film transistors 106 are controlled, thereby to apply gradation voltages to the pixels 111 to 113.

Moreover, the output of the common electrode driving unit 105 is connected at first with the glass substrate on the thin film transistor side by using a part of the flat cable connecting the drain driver 102 and the thin film transistor liquid crystal display panel 101.

Next, the output of the common electrode driving unit 105 is connected with the common bus line 110 formed on the thin film transistor side glass substrate, through the not-shown anisotropic conductive film.

The thin film transistor liquid crystal display panel 101 is composed of 640×3×480 pixels.

Figure 12:
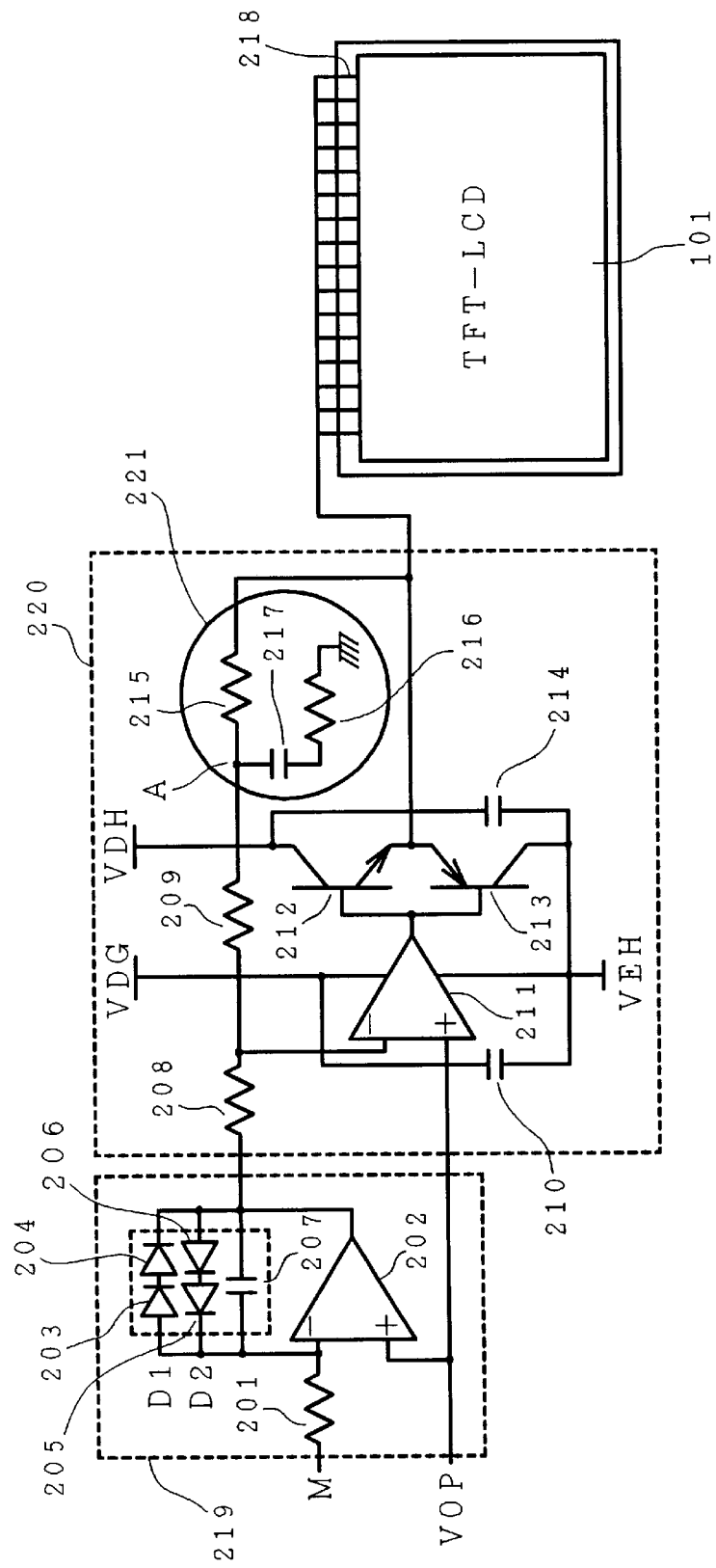
FIG. 12 is a circuit diagram showing a schematic construction of a common electrode driving unit of Embodiment 3.

FIG. 12 is a circuit diagram showing a schematic construction of the common electrode driving unit 105 of Embodiment 3. Numerals 201, 208, 209, 215 and 216 designate resistors; 202 and 211 operational amplifiers; 203 to 206 diodes; 207, 210, 214 and 217 capacitors; 212 an NPN transistor; 213 a PNP transistor; 218 an anisotropic conductive film; 219 a common electrode driving voltage generator; 220 a common electrode driver; and 221 an integrator (differential signal superposing means).

In the common electrode driving voltage generator 219, as shown in FIG. 12, an electric current flows through the resistor 201 and the capacitor 207 to charge the capacitor 207 when a square wave of High level is inputted (or applied) from an M signal terminal (or alternating signal input terminal), so that the output voltage of the common electrode driving voltage generator 219 (or the output voltage of the operational amplifier 202) gradually drops. When the potential difference between the two terminals of the capacitor 207 exceeds the forward voltage of the series-connected diodes 203 and 204 which are connected in parallel with the capacitor 207, the diodes 203 and 204 are rendered conductive, so that the output voltage becomes a constant voltage value on the lower potential side.

When a square wave of Low level is inputted to the M signal terminal, on the other hand, an electric current flows in the opposite direction to that of the High level square wave through the resistor 201 and the capacitor 207 to charge the capacitor 207 in the opposite polarity, so that the output voltage gradually rises. When the potential difference between the two terminals of the capacitor 207 exceeds the forward voltage of the series-connected diodes 205 and 206 which are connected in parallel with the capacitor 207, the diodes 205 and 206 are rendered conductive, so that the output voltage becomes a constant voltage value on the higher potential side.

By repeating the processing described above, an alternating signal of trapezoidal wave the center of the amplitude of which is the reference voltage VOP is outputted and applied to the resistor 208.

The common electrode driver 220 is a negative feedback amplifier which is basically constructed of the resistors 208 and 209, the operational amplifier 211, and the output buffer composed of the NPN transistor 212 and the PNP transistor 213. This negative feedback amplifier generates a common electrode driving signal necessary for driving the common electrode of the thin film transistor liquid crystal display panel 101, from the output voltage of the common electrode driving voltage generator 219.

When the output voltage Eout of the common electrode driver 220 is calculated using the following Equation 1 when the resistance of the resistor 215 is sufficiently smaller than that of the resistor 209:

$$E\text{out} = \frac{-R_2 \cdot A(\omega)}{R_1 + R_2 + R_1 \cdot A(\omega)} E\text{in} \quad \text{[Equation 1]}$$

where Ein is the output of the common electrode driving voltage generator; ω is the angular frequency of Ein; A(ω) is the gain of the operational amplifier 211 for the angular frequency ω; $R_1$ is the resistance of the resistor 208; and $R_2$ is the resistance of the resistor 209.

At this time, the integrator 221 blunts the output waveform of the common electrode driver 220 which is applied to the resistor 209 (hereinafter referred to as "feedback resistor 209") connected with the aforementioned buffer, and thereby the common electrode driving signal, to which is added the signal having a differential waveform of the time constant determined by the resistors 215 and 216 and the capacitor 217, is outputted.

When the common electrode driver 220 takes the High output, the current flows through the resistors 215 and 216 and the capacitor 217, and consequently the voltage applied to the feedback resistor 209 becomes the value which is determined by dividing the output voltage of the common electrode driver 220 by the resistors 215 and 216. As a result, this divided voltage is equal to the voltage calculated using Formula 1 for the output voltage of the common electrode driver 220.

As the charge of the capacitor 217 progresses, the potential at point A rises, the current flowing through the resistor 215 drops, and the voltage applied to the feedback resistor 209 approaches the output voltage of the common electrode driver 220. As a result, the output voltage approaches the value which is calculated using Formula 1, so that the output voltage comes to a constant value at the end of the charge of the capacitor 217.

When the output voltage of the common electrode driver 220 takes the Low value, on the other hand, the charge in the capacitor 217 accumulated while the output is High is released, so that the potential at point A becomes the voltage value which is calculated using Formula 1.

At this time, the voltage applied to the feedback resistor 209 becomes the value which is determined by the resistors 215 and 216 as in the aforementioned High case, so that the output voltage of the common electrode driver 220 at this instant is equal to the voltage which is calculated using Formula 1 for the aforementioned divided voltage.

As the discharge of the capacitor 217 progresses, the potential at point A drops, the voltage applied to the feedback resistor 209 also approaches the output voltage of the common electrode driver 220. As a result, the output voltage approaches the voltage value which is calculated using Formula 1, so that the output voltage becomes a constant value at the end of the discharge of the capacitor 217.

Figure 13:
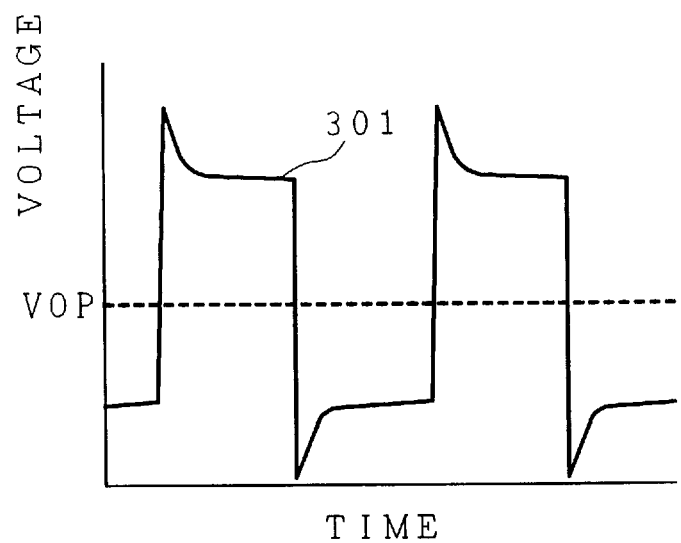
FIG. 13 is a diagram showing the output of the common electrode driving unit of Embodiment 3.

When the output of the common electrode driver 220 thus changes from the Low to High levels or from the High to Low levels, the current flows through the resistors 215 and 216 and the capacitor 217 to charge or discharge the capacitor 217, so that the voltage applied to the feedback resistor 209 exponentially rises or drops. As a result, the output waveform 301 of the common electrode driver 220 (the NPN transistor 212 and the PNP transistor 213) becomes the output waveform, as shown in FIG. 13, which is the sum of the trapezoidal wave which is intrinsically outputted and the voltage (differential waveform) corresponding to the delay of the feedback voltage caused by the integrator composed of the resistors 215 and 216 and the capacitor 217.

This differential waveform portion of the output 301 is attenuated by the time constant which is determined by the wiring resistance from the common electrode driving unit 105 to the thin transistor liquid crystal display panel 101, the wiring resistance of the anisotropic conductive film 218 and the common electrode line 110, the capacitances of the green, blue and red pixels 111 to 113 connected with the common electrode line 110, and the stray capacitance. As a result, the trapezoidal wave such that the portion of the differential waveform is integrated is applied to the common electrode of the thin film transistor liquid crystal display panel 101.

Figure 14:
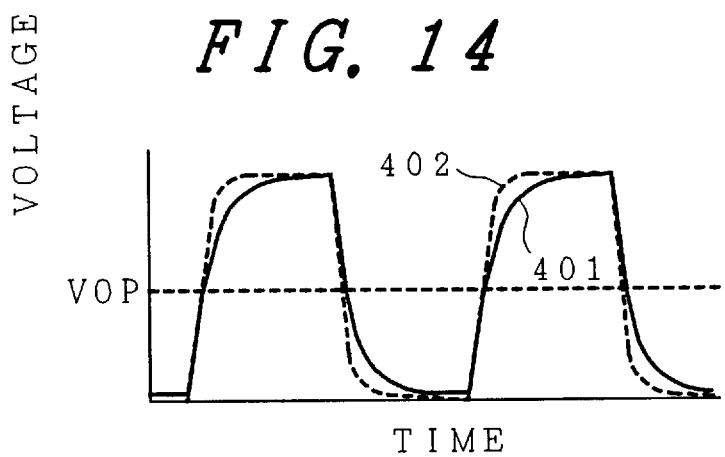
FIG. 14 is a diagram showing measured common electrode driving signals of the common electrode driving units of the prior art and Embodiment 3 incorporated in thin film transistor liquid crystal devices.

When the common electrode of the thin film transistor liquid crystal display panel 101 is driven by the common electrode driving unit 105 of the output 301, the results of measurement of the common electrode driving signal applied to the common electrode is illustrated in FIG. 14. Numeral 401 denotes the waveform of the common electrode driving signal by the common electrode driving unit of the prior art, and numeral 402 denotes the waveform of the common electrode driving signal by the common electrode driving unit 105 of Embodiment 3.

As will be seen from FIG. 14, the bluntness of the waveform at the rising/falling times of the common electrode driving signal is improved.

FIG. 15 is a graph showing the relationship between the lateral smear and the drive frequency of the common electrode driving signal, and the relationship between the contrast ratio and the drive frequency, obtained by using the common electrode driving unit shown in FIG. 12.

As the drive frequency increases, the effect of the voltage (hereinafter referred to as "boost voltage"), on which is superposed the differential signal applied to the common electrode, becomes more remarkable. This effect is high especially in the contrast ratio within a region of the drive frequency of 20 MHz or more. Therefore, this effect is remarkable especially in the thin film transistor liquid crystal display panel having a larger screen and more gradations, because the drive frequency for the liquid crystal of such a thin film transistor liquid crystal display panel has to be made the higher.

As described above, there is provided in the negative feedback portion of the common electrode driver 220 the integrator 221 which has a time constant corresponding to the stray capacitance and the wiring resistance of the common electrode line and the connection resistance of the anisotropic conductive film for connecting the common electrode driver 220 and the thin film transistor liquid crystal display panel 101. As a result, the output of the common electrode driver is the output to which is added a voltage equal to the blunt portion of the output waveform caused by the time constant which is determined by the stray capacitance and the wiring resistance of the common electrode line. Thus, the bluntness of the common electrode drive signal caused by the time constant can be corrected to prevent the drop of the contrast and the lateral smear of the liquid crystal device which are caused by the drop in the writing percentage due to the fact that the common electrode driving signal is made blunt compared to a predetermined voltage in the thin film transistor liquid crystal display panel.

EMBODIMENT 4

Figure 16:
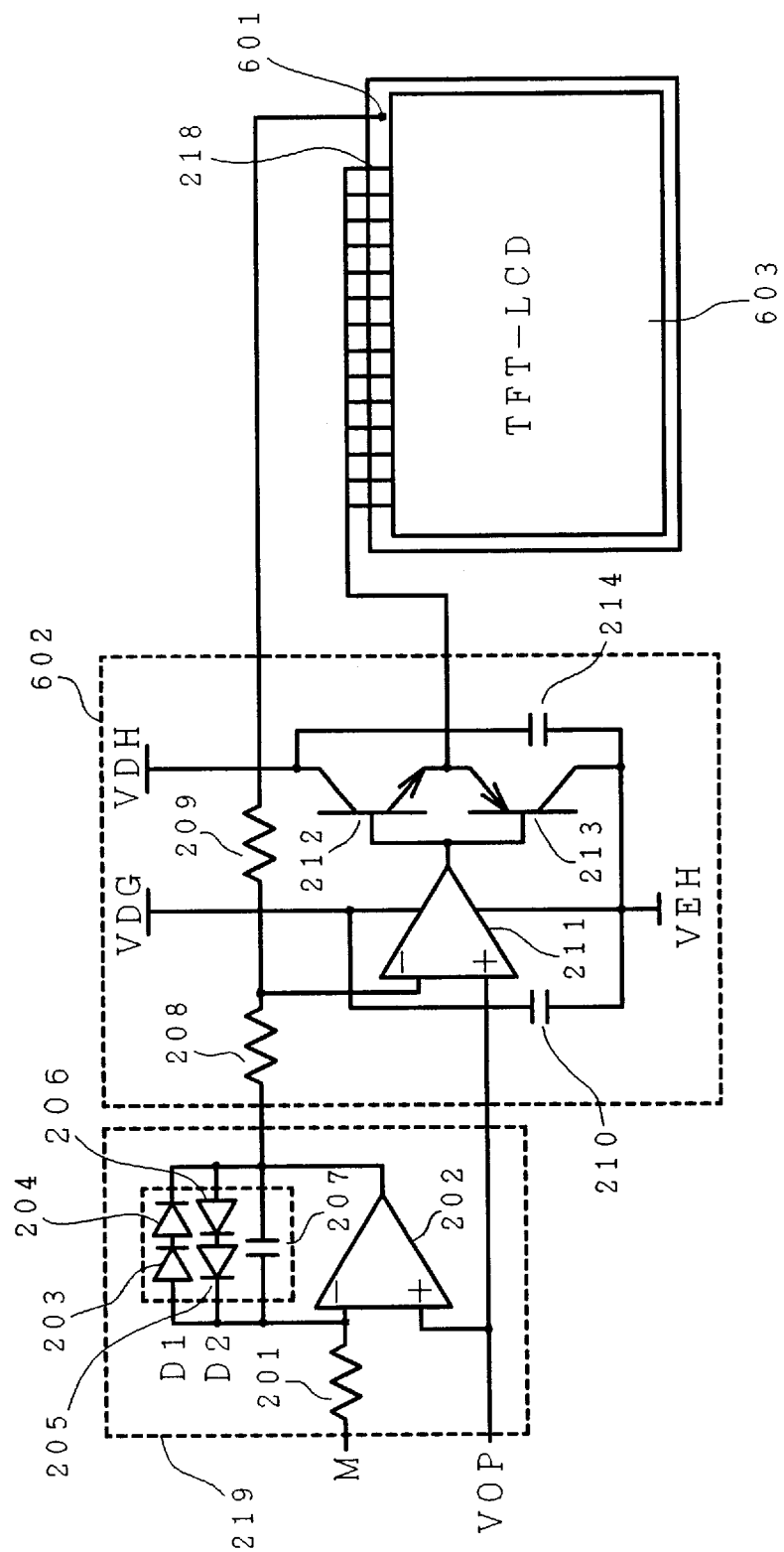
FIG. 16 is a circuit diagram showing a schematic construction of a common electrode driving unit of Embodiment 4.

FIG. 16 is a circuit diagram showing a schematic construction of a common electrode driving unit of Embodiment 4. Numerals 201, 208 and 209 designate the resistors; 202 and 211 the operational amplifiers; 203 to 206 the diodes; 207, 210 and 214 the capacitors; 212 the NPN transistor; 213 the PNP transister; 218 the anisotropic conductive film; 219 the common electrode driving voltage generator; 601 a feedback terminal; and 602 a common electrode driver.

In FIG. 16, the common electrode driving voltage generator 219 will not be described because it has the same construction as that of Embodiment 3.

The common electrode driver 602 is a negative feedback amplifier which is basically constructed of the resistors 208 and 209, the operational amplifier 211 and the output buffer composed of the NPN transistor 212 and the PNP transistor 213. In this basic construction, however, the feedback voltage of the operational amplifier 211 is fed back not directly from the output of the common electrode driver 602 but from the feedback terminal 601 which is mounted on a thin film transistor liquid crystal display panel 603.

At this time, the bluntness of the common electrode signal, caused by the resistance of the anisotropic conductive film for connecting the thin film transistor liquid crystal display panel 603 and the common electrode driving unit 105, the resistance of the common electrode line in the thin film transistor liquid crystal display panel 603 and the stray capacitance of the common electrode line, is fed back from the feedback terminal 601 to the feedback resistor 209 of the common electrode driver 602, so that the output of the common electrode driver 602 becomes the voltage value calculated by Formula 1, on the basis of that feedback voltage. As a result, the common electrode driving signal at the feedback terminal 601 is the trapezoidal wave having the voltage value which is calculated from the output of the operational amplifier 202 by formula 1.

The bluntness of the common electrode driving signal in the thin film transistor liquid crystal display panel 603 is corrected by applying the voltage not to the output of the feedback resistor 209 of the common electrode driver 602 but to a predetermined portion which is provided in the common electrode line of the thin film transistor liquid crystal display panel 603, as described above.

In short, the bluntness of the common electrode driving signal in the thin film transistor liquid crystal display panel 603 is corrected by feeding back the output, considering the connection resistance of the anisotropic conductive film for connecting the thin film transistor liquid crystal display panel 603 and the output of the common electrode driver 602, the wiring resistance of the common electrode line from the anisotropic conductive film to the feedback terminal 601, and their stray capacitances, to the feedback amplifier of the common electrode driver.

Thanks to the construction thus far described, the drop of the contrast ratio and the lateral smear, which are caused by the bluntness of the common electrode driving signal, can be prevented without increasing the number of parts used.

Since the number of parts is not increased, moreover, the common electrode driver 602 can be constructed with the same driver area as that of the liquid crystal device of the prior art.

Incidentally, the feedback terminal 601 of the present Embodiment 4 is one of the terminals of the prior art for inputting the common electrode driving signal. It is obvious that by using a transparent electrode or the like to extract the feedback signal from a position where the stray capacitance of the common electrode line of the thin film transistor liquid crystal display panel 603 is intermediate in the panel, the drop of the contrast ratio and the lateral smear can be prevented.

EMBODIMENT 5

Figure 17:
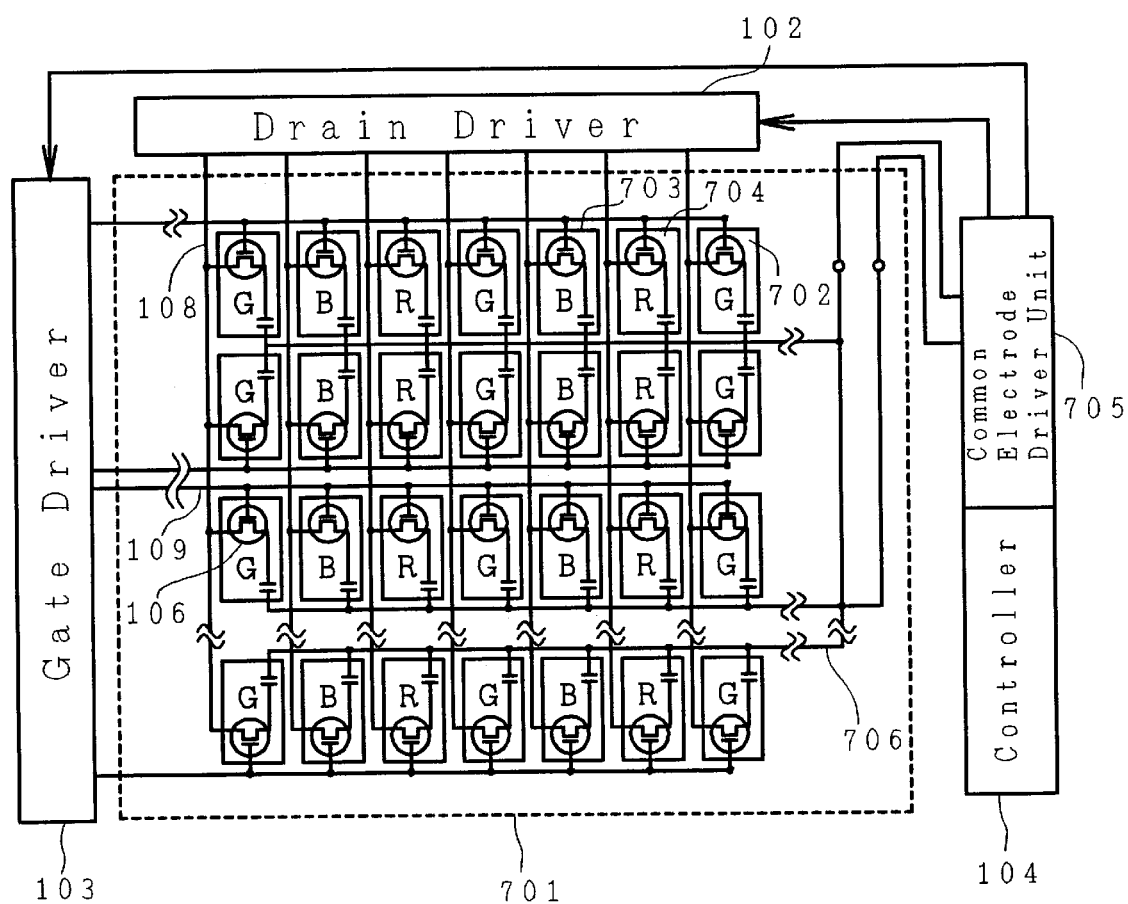
FIG. 17 is a block diagram showing a schematic construction of a liquid crystal device of Embodiment 5.
Figure 19:
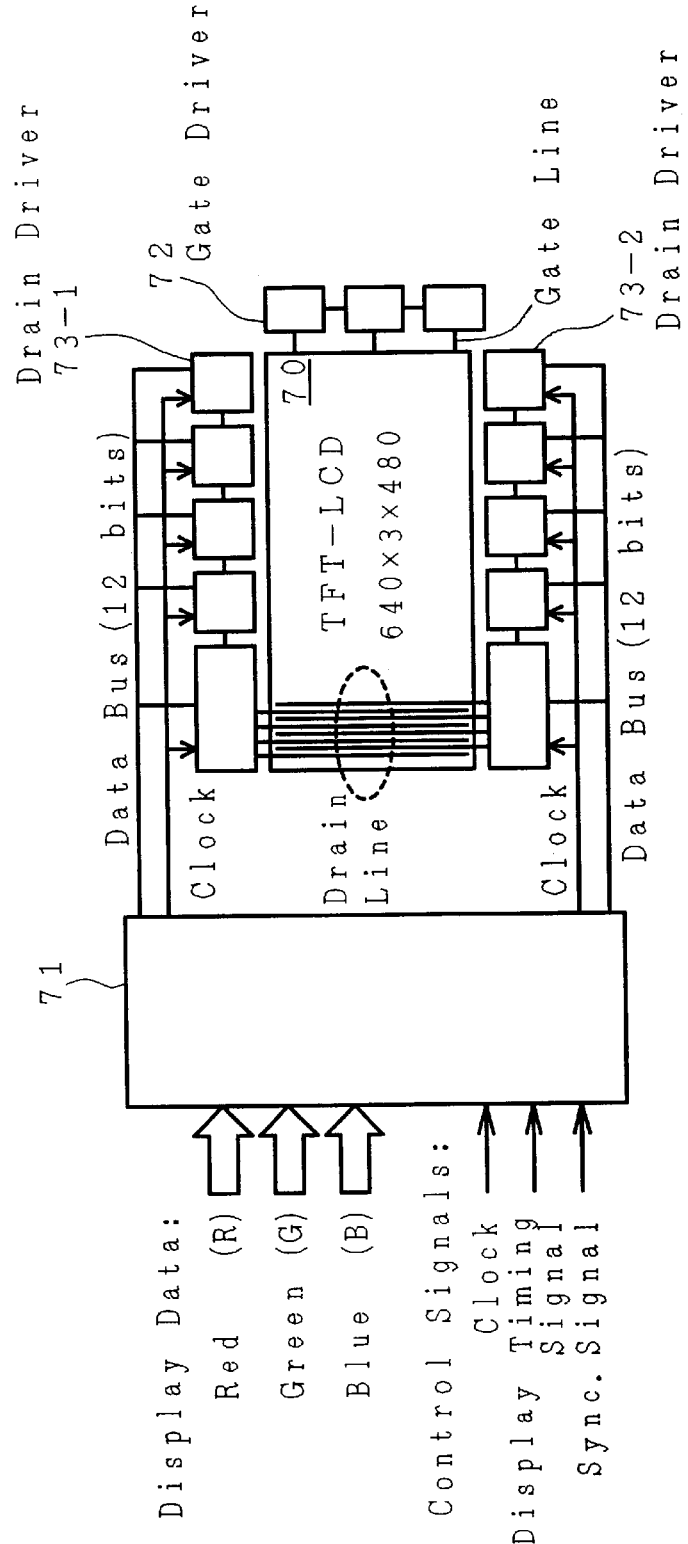
FIG. 19 is a block diagram for explaining the schematic construction of the TFT liquid crystal device of the prior art.
Figure 20:
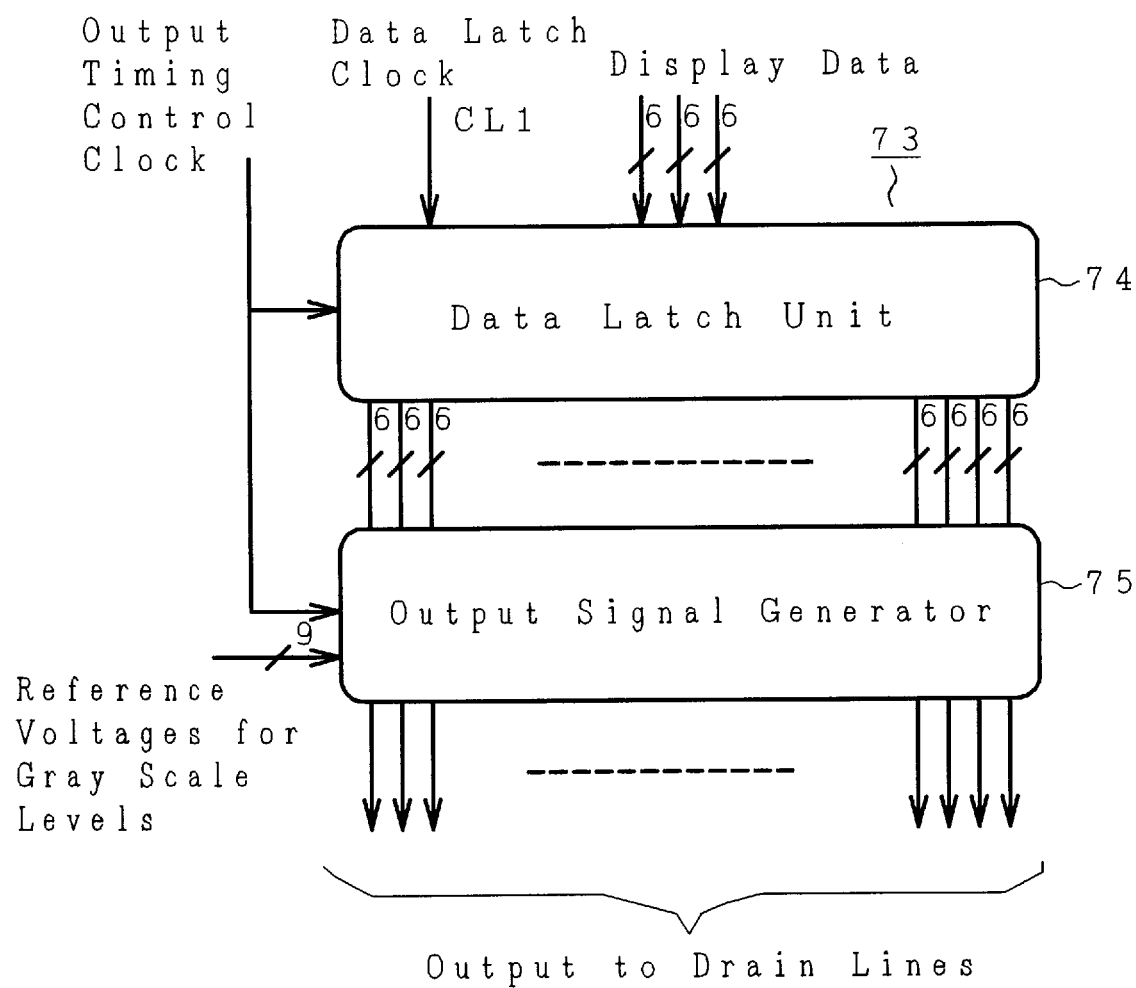
FIG. 20 is a block diagram for explaining the schematic construction of the drain driver of the TFT liquid crystal device of the prior art.
Figure 21:
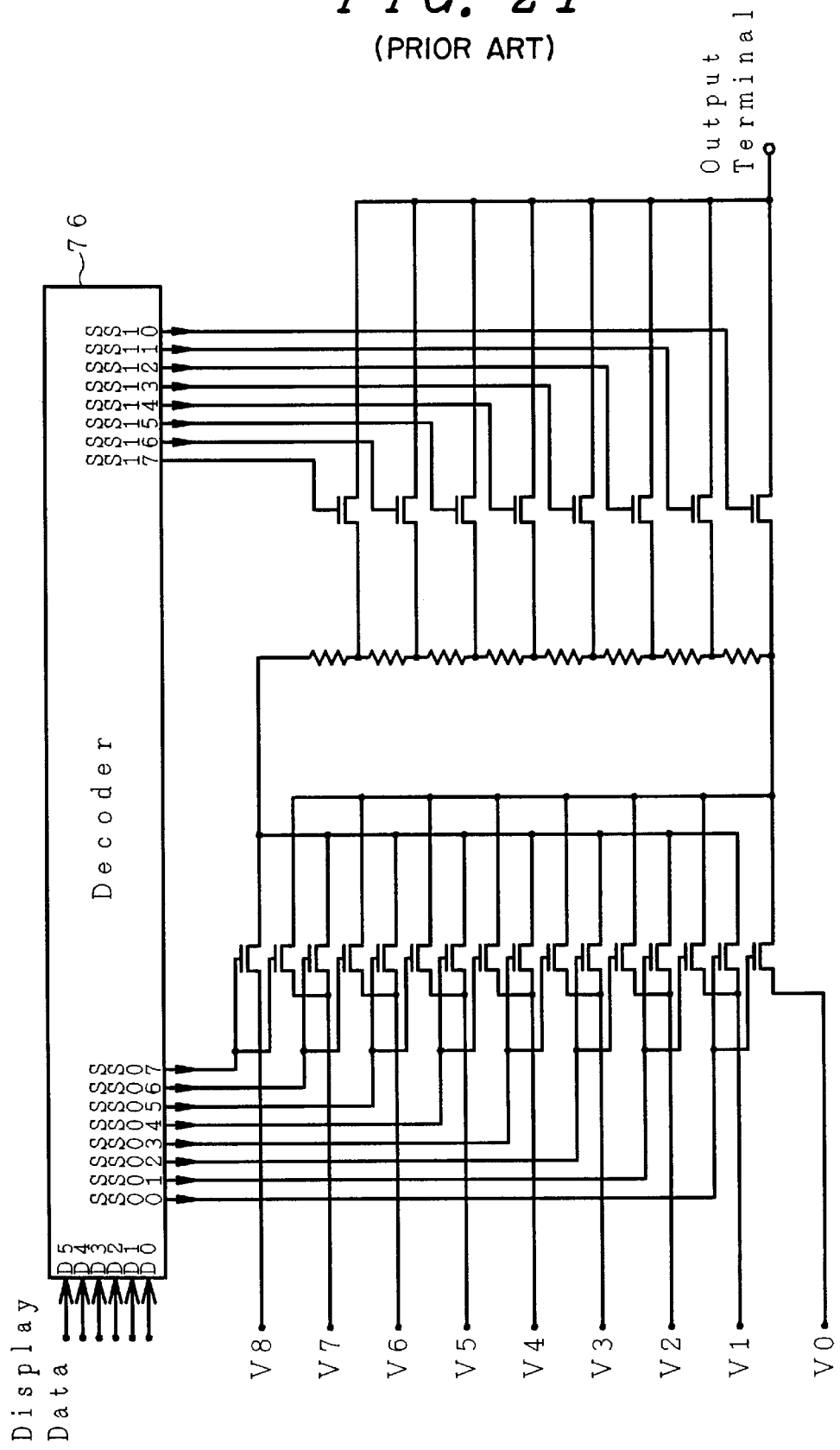
FIG. 21 is a circuit construction diagram of the output signal generator of the drain driver of the TFT liquid crystal device of the prior art.
Figure 22:
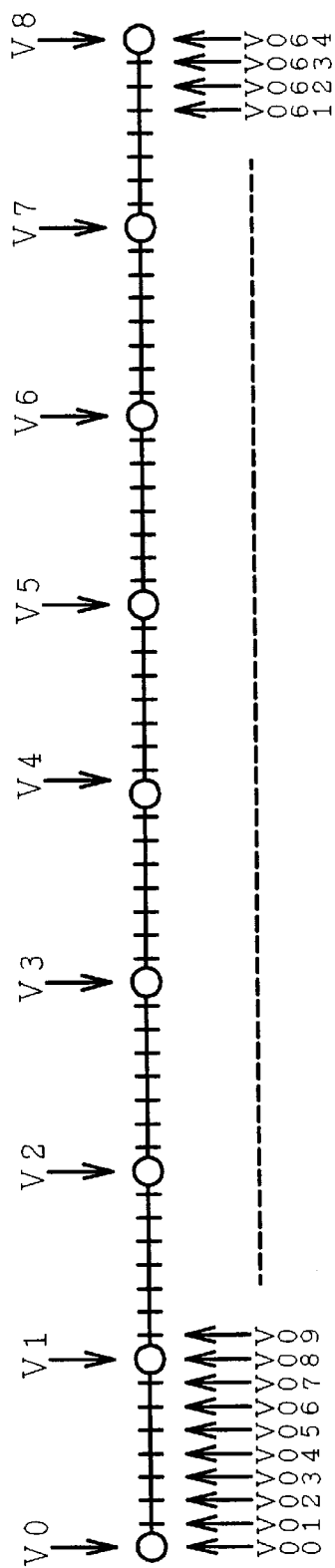
FIG. 22 is an explanatory diagram of the relation between the gradation reference voltages and the output voltage of the prior art.
Figure 23:
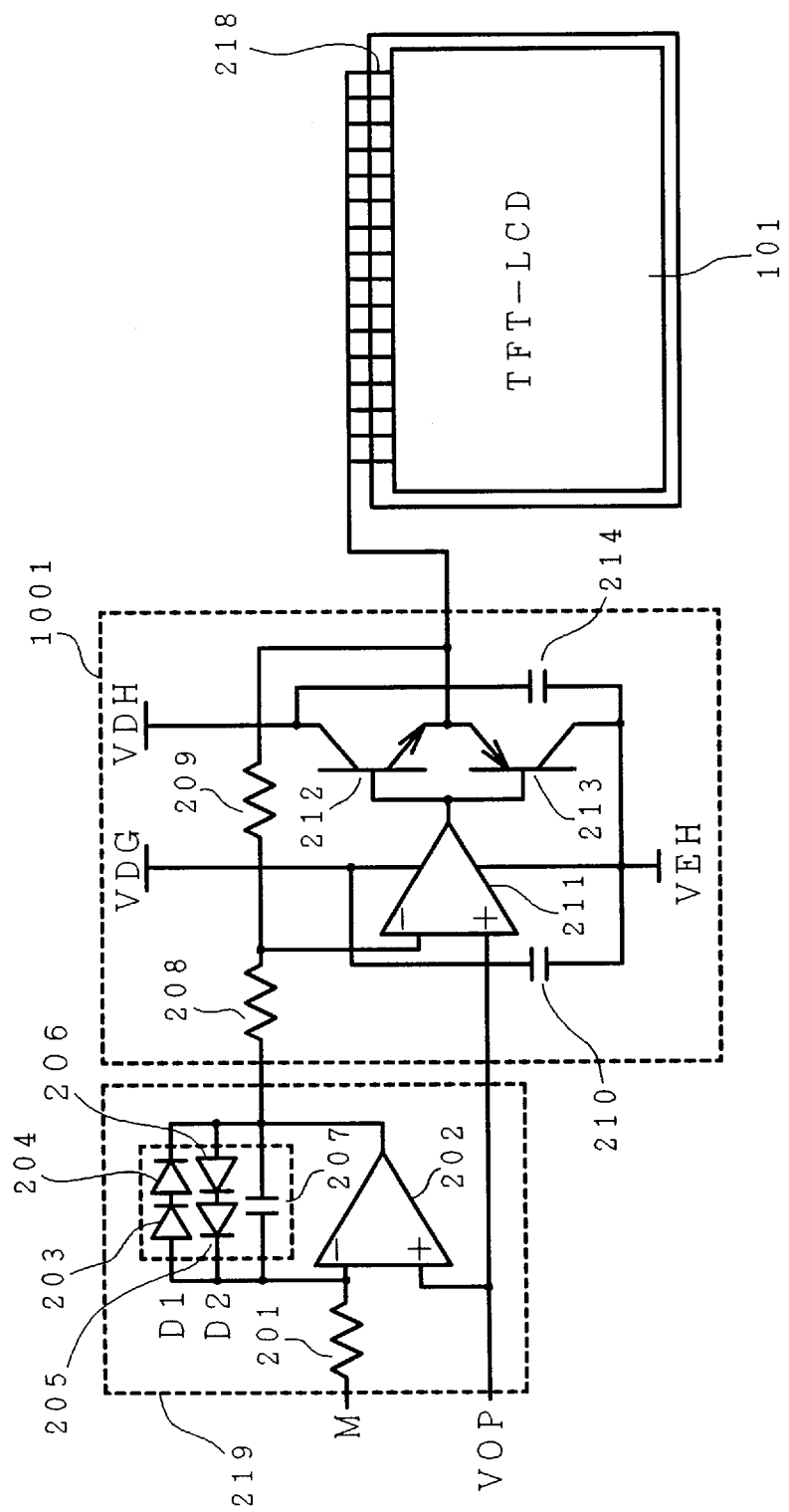
FIG. 23 is a circuit diagram showing the schematic construction of the common electrode driving unit of the liquid crystal device of the prior art.
Figure 24:
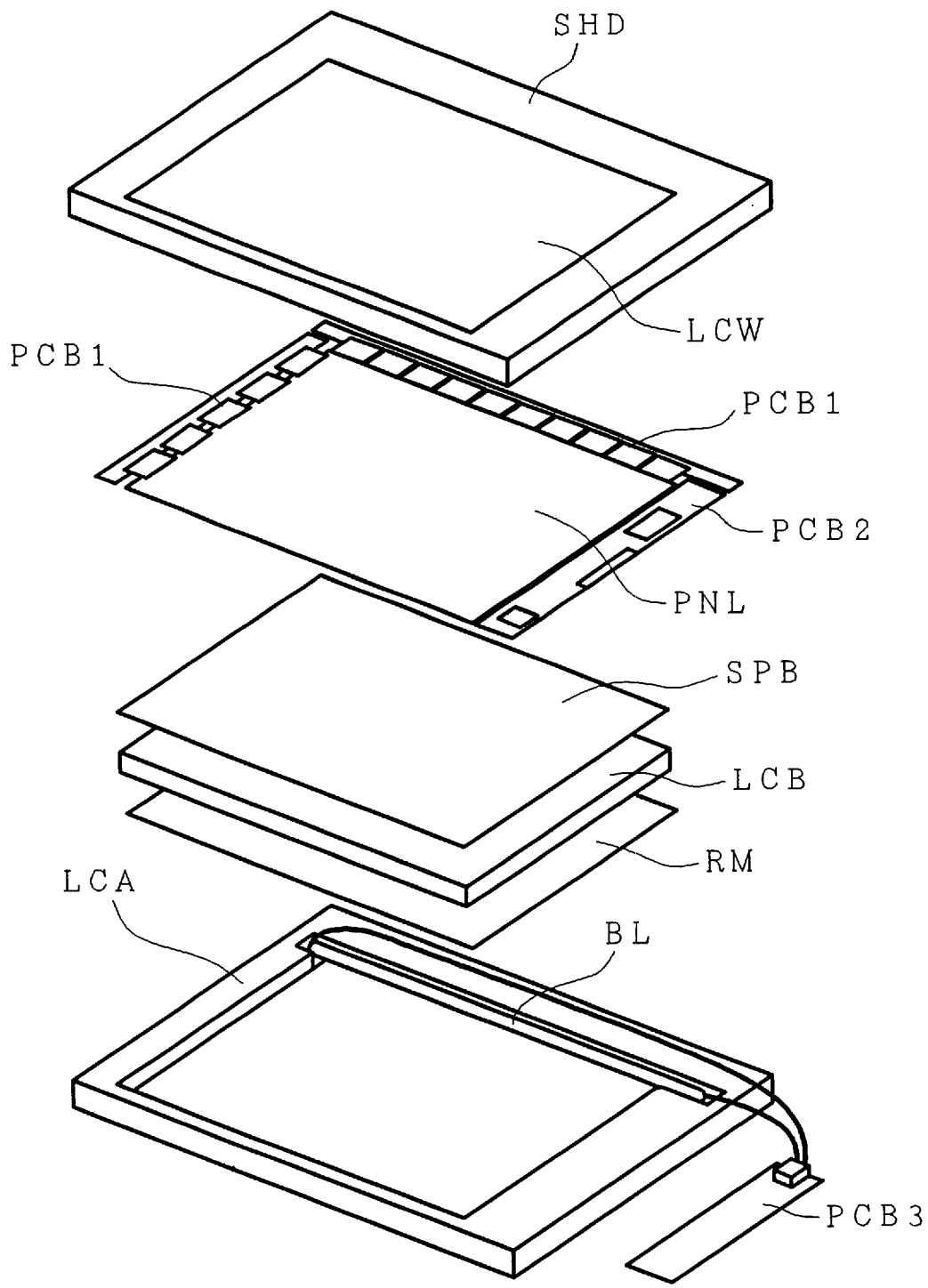
FIG. 24 is an exploded perspective view showing the individual components of the liquid crystal display module of the prior art.

FIG. 17 is a block diagram showing a schematic construction of a liquid crystal device of Embodiment 5.

In FIG. 17, numeral 701 designates an in-plane field thin film transistor liquid crystal display panel (TFT-LCD); 102 a drain driver; 103 a gate driver; 104 a controller (display controller); 705 a common electrodes driving unit; 106 a thin film transistor (TFT); 108 a drain line; 109 a gate line; 706 a common electrode line; 702 a green pixel; 703 a blue pixel; and 704 a red pixel.

In the liquid crystal device of Embodiment 5, as shown in FIG. 17, the drain driver 102 for mounting the not-shown drain driver unit is provided on the upper side of the in-plane field thin film liquid crystal display panel 701; the gate driver 103 for mounting the not-shown gate driver is provided on one side portion; and the controller 104 and the common electrodes driving unit 705 are provided on the opposite side portion to the gate driver 103.

The drain driver 102, the gate driver 103, the controller 104 and the common electrodes driving unit 705 are mounted on their respective dedicated printed board.

The output of the drain driver 102 is connected with the drain lines 108 which are connected with the drain terminals of the thin film transistors 106.

The output of the gate driver 103 is connected with the gate lines 109 which are connected with the gate terminals of the thin film transistors 106. By the control signals inputted from the not-shown data processor to the controller 104, the ON/OFF of the thin film transistors 106 are controlled to apply gradation voltages to the pixels 702 to 704.

Incidentally, the common electrodes driving unit 705 has an circuit construction identical to that of the common electrode driving unit 105 of the foregoing Embodiment 5.

The common electrode line 706 is formed into a comb-teeth shape and has a large wiring resistance and a large stray capacitance, i.e., an especially large time constant of integration resulting in the waveform bluntness, so that it exerts a high effect upon the common electrodes driving unit 705.

FIG. 18 is a graph showing the relations between the boost voltage and the rate of occurrence of the lateral smear in both the vertical field thin film transistor liquid crystal display panel of the prior art, and the inplane field thin film transistor liquid crystal display panel shown in FIG. 11 and FIG. 17.

In the case of the liquid crystal device of the prior art, the rate of occurrence of the lateral smear is low when the boost voltage is about 3 to 5 Volts and is the minimum when it is about 3.8 Volts, that is, the rate increases when the voltage is higher or lower than the minimum.

In the case of the in-plane field liquid crystal device, on the other hand, the rate of occurrence of lateral smear is zero, i.e., completely no lateral smear occurs, when the boost voltage is about 2.4 to 3 Volts. That is, it increases when the voltage is higher or lower than the voltage value.

From this graph, it can be seen that the contrast ratio and the rate of occurrence of the lateral smear are improved irrespective of the difference in the drive type of the thin film transistor liquid crystal display panel.

Especially in the in-plane field thin film transistor liquid crystal display panel of Embodiment 5, the common electrode and the common electrode line are structurally formed into the comb-teeth shape. The effect is so high that the lateral smear completely disappears especially in the vicinity of the boost voltage of 3 Volts.

From the fact that the rate of occurrence of the lateral smear increases at other than the aforementioned boost voltage irrespective of the drive type, it is also easily found that the optimum boost voltage exists.

Incidentally, the detail of the in-plane field thin film transistor liquid crystal display panel should be referred to Japanese Patent Application No. 105862/1995 filed by the same Applicant.

In the description of Embodiment 5, the operation of the in-plane field thin film transistor liquid crystal display panel is applied to a liquid crystal device is explained.

Moreover, the effect of the signal correction can be further enhanced by using the voltage at the central portion of the thin film transistor liquid crystal display panel as the feedback voltage.

Moreover, a negative feedback amplifier is used as the feedback amplifier in the embodiments thus far described. It is, however, needless to say that even a positive feedback amplifier can also be used.

As has been described hereinbefore, according to the present invention, display having little flicker can be made even if the polarity Inverting period of the common voltage may be extended from one horizontal period to one frame period, by using the two different common voltages in the so-called in-plane field liquid crystal device in which the liquid crystal is driven by the electric field predominantly in parallel with the substrate surface.

As a result, the power consumption concerning to the panel is greatly reduced as compared with the case using one common voltage, as illustrated in FIG. 8.

Specifically, FIG. 8 is an explanatory diagram for comparing the power consumption reducing effect according to the present invention with that of the prior art. As illustrated, it will be seen that although the effect by charging/discharging the guide lines of both the invention and the prior art are identical, the power consumption caused by charging/discharging the parasitic capacitance attributed to the alternating common voltage is greatly reduced according to the present invention.

Incidentally, although the driver units for generating the common voltage increases to at most two times in accordance with the present invention, the loss due to the DC component of the driver units decreases because the frequency of the polarity inversion of the common voltage is reduced from by every one row to by every one frame, so that the power consumption caused by charging/discharging the parasitic capacitance attributed to the alternating common voltage is reduced to about 1/500 in the liquid crystal device of the VGA specifications, whereby the power consumption of the entire liquid crystal device drops.

Moreover, the lines for feeding the two common voltages to the pixels are individually arranged at the two edges of the panel, so that the parasitic capacitance between the lines can be reduced and the power consumption is reduced.

Furthermore, the bluntness of the drive waveform, which is caused by integrating the common electrode driving waveform by the resistance and stray capacitance of the lines from the common electrode driving unit to the thin film transistor liquid crystal display panel, is superposed in advance on the aforementioned common electrode driving signal and is outputted. Hence the bluntness of the common electrode driving waveform in the common electrode liquid crystal display panel is reduced. As a result, it is possible to prevent the drop of the contrast and the rate of occurrence of the lateral smear, which are caused by the reduction in the writing percentage due to the bluntness of the common electrode driving signal from a predetermined voltage.

Although the present invention has been specifically described in connection with the foregoing embodiments, it should not be limited thereto but can naturally be modified in various manners without departing from the gist thereof.

We claim:
1. A liquid crystal device comprising: a liquid crystal sealed in between a pair of two substrates, at least one of which is transparent; pixels arranged in a matrix shape on one of said substrates and having thin film transistor elements, pixel electrodes connected with the source electrodes of said thin film transistors, and common electrodes; gate lines connected with the gate electrodes of the thin film transistors adjoining in each row; drain lines connected with the drain electrodes of the thin film transistors adjoining in each column; odd row common electrodes lines connected with said common electrodes in the individual odd rows; even row common electrode lines connected with said common electrodes in the individual even rows; an odd row common bus line connected with said odd row common electrode lines; an even row common bus line connected with said even row common electrode lines; and drive voltage applying means for applying voltage signal waveforms between said pixel electrodes and said common electrodes, wherein said pixel electrodes and said common electrodes are so arranged as to apply electric fields having components parallel with the substrate plane between said pixel electrodes and said common electrodes by said drive voltage applying means, wherein said parallel electric field components are generated to drive the liquid crystal between said pixel electrodes and said common electrodes by applying voltage waveforms varying with video data to said pixel electrodes and pulse waveforms having binary amplitude levels to said common electrodes, wherein the waveforms applied to said odd row common electrode lines and said even row common electrode lines by said drive voltage applying means have inverted phases to each other, and wherein the pulse waveforms to be applied to said odd row common electrode lines and said even row common electrode lines have periods longer than two times of the horizontal interval.

2. A liquid crystal device according to claim 1, wherein said odd row common bus line and said even row common bus line are made of a gate wiring material of said gate lines and a drain wiring material of said drain lines.

3. A liquid crystal device according to claim 1, wherein said odd row common electrode lines and said even row common electrode lines are arranged in parallel with said gate lines in the pixel region, wherein said odd row common electrode lines and said even row common electrode lines are individually gathered outside of said region and are connected with the odd row common bus line and the even row common bus line, respectively.

4. A liquid crystal device according to claim 3, wherein the connection portions, in which said odd row common electrode lines and said even row common electrode lines are connected with the odd row common bus line and the even row common bus line, respectively, are arranged outside of the end portions of said gate lines, and are at the individually different gate line end portions.

5. A liquid crystal device comprising: a liquid crystal sealed in between a pair of two substrates, at least one of which is transparent; pixels arranged in a matrix shape on one of said substrates and having thin film transistor elements, pixel electrodes connected with the source electrodes of said thin film transistors, and common electrodes; gate lines connected with the gate electrodes of the thin film transistors adjoining in each row; drain lines connected with the drain electrodes of the thin film transistors adjoining in each column; odd row common electrodes lines connected with said common electrodes in the individual odd rows; even row common electrode lines connected with said common electrodes in the individual even rows; an odd row common bus line connected with said odd row common electrode lines; an even row common bus line connected with said even row common electrode lines; and drive voltage applying means for applying voltage signal waveforms between said pixel electrodes and said common electrodes, wherein said pixel electrodes and said common electrodes are so arranged as to apply electric fields having components parallel with the substrate plane between said pixel electrodes and said common electrodes by said drive voltage applying means, wherein said parallel electric field components are generated to drive the liquid crystal between said pixel electrodes and said common electrodes by applying voltage waveforms varying with video data to said pixel electrodes and pulse waveforms having binary amplitude levels to said common electrodes, wherein the waveforms applied to said odd row common electrode lines and said even row common electrode lines by said drive voltage applying means have inverted phases to each other, wherein said drive voltage applying means includes the common electrode driving unit for outputting common electrode driving signals for driving said common electrode lines of said thin film transistor liquid crystal display panel, wherein said common electrode driving unit includes differential signal superposing means for generating a differential signal and superposing it upon said common electrode driving signals, wherein said differential signal superposing means generates a differential signal for a period longer than at least two times of the horizontal interval and superposes said differential signal upon said common electrode driving signals.

6. A liquid crystal device comprising: a liquid crystal sealed in between a pair of two substrates, at least one of which is transparent; pixels arranged in a matrix shape on one of said substrates and having thin film transistor elements, pixel electrodes connected with the source electrodes of said thin film transistors, and common electrodes; common electrode lines connected with said common electrodes; and a common electrode driving unit for outputting a common electrode driving signal for driving the common electrode lines of said thin film transistor liquid crystal display panel, wherein said pixel electrodes and said common electrodes are so arranged as to apply electric fields having components parallel with the substrate plane between said pixel electrodes and said common electrodes, wherein said common electrode driving unit includes differential signal superposing means for generating a differential signal and superposing it upon said common electrode driving signal, and wherein said common electrode driving unit includes a feedback amplifier, and wherein said differential signal superposing means is an integrator including resistors and a capacitor inserted into the feedback loop of said feedback amplifier.

7. A liquid crystal device comprising: a liquid crystal sealed in between a pair of two substrates, at least one of which is transparent; pixels arranged in a matrix shape on one of said substrates and having thin film transistor elements, pixel electrodes connected with the source electrodes of said thin film transistors, and common electrodes; common electrode lines connected with said common electrodes; and a common electrode driving unit for outputting a common electrode driving signal for driving the common electrode lines of said thin film transistor liquid crystal display panel, wherein said pixel electrodes and said common electrodes are so arranged as to apply electric fields having components parallel with the substrate plane between said pixel electrodes and said common electrodes, wherein said common electrode driving unit includes differential signal superposing means for generating a differential signal and superposing it upon said common electrode driving signal, wherein said common electrode driving unit includes a feedback amplifier, and wherein said differential signal superposing means is an integrator including resistors and a capacitor inserted into the feedback loop of said feedback amplifier, and wherein said common electrode driving unit includes a feedback amplifier, and wherein said differential signal superposing means is an integrator including a wiring resistor of the signal line from the output of said common electrode driving unit to said thin film transistor liquid crystal display panel, and a wiring resistor of said common electrode line, and capacitors of a stray capacitor of the signal line from the output of said common electrode driving unit to said thin film transistor liquid crystal display panel and a stray capacitor of said common electrode line, inserted into the feedback loop of the feedback amplifier.

8. A liquid crystal device comprising: a liquid crystal sealed in between a pair of two substrates, at least one of which is transparent; pixels arranged in a matrix shape on one of said substrates and having thin film transistor elements, pixel electrodes connected with the source electrodes of said thin film transistors, and common electrodes; gate lines connected with the gate electrodes of the thin film transistors adjoining in each row; drain lines connected with the drain electrodes of the thin film transistors adjoining in each column; odd row common electrodes lines connected with said common electrodes in the individual odd rows; even row common electrode lines connected with said common electrodes in the individual even rows; an odd row common bus line connected with said odd row common electrode lines; an even row common bus line connected with said even row common electrode lines; and drive voltage applying means for applying voltage signal waveforms between said pixel electrodes and said common electrodes, wherein said pixel electrodes and said common electrodes are so arranged as to apply electric fields having components parallel with the substrate plane between said pixel electrodes and said common electrodes by said drive voltage applying means, wherein said parallel electric field components are generated to drive the liquid crystal between said pixel electrodes and said common electrodes by applying voltage waveforms varying with video data to said pixel electrodes and pulse waveforms having binary amplitude levels to said common electrodes, wherein the waveforms applied to said odd row common electrode lines and said even row common electrode lines by said drive voltage applying means have inverted phases to each other;

wherein said drive voltage applying means includes the common electrode driving unit for outputting common electrode driving signals for driving said common electrode lines of said thin film transistor liquid crystal display panel, wherein said common electrode driving unit includes differential signal superposing means for generating a differential signal and superposing it upon said common electrode driving signals;

wherein said differential signal superposing means generates a differential signal for a period longer than at least two times of the horizontal interval and superposes said differential signal upon said common electrode driving signals; and wherein said common electrode driving unit includes a feedback amplifier, and wherein said differential signal superposing means is an integrator including resistors and a capacitor inserted into the feedback loop of said feedback amplifier.

9. A liquid crystal device according to claim 8, wherein said differential signal superposing means generates a differential signal for a period longer than at least two times of the horizontal interval and superposes said differential signal upon said common electrode driving signals.

10. A liquid crystal device comprising: a liquid crystal sealed in between a pair of two substrates, at least one of which is transparent; pixels arranged in a matrix shape on one of said substrates and having thin film transistor elements, pixel electrodes connected with the source electrodes of said thin film transistors, and common electrodes; gate lines connected with the gate electrodes of the thin film transistors adjoining in each row; drain lines connected with the drain electrodes of the thin film transistors adjoining in each column; odd row common electrodes lines connected with said common electrodes in the individual odd rows; even row common electrode lines connected with said common electrodes in the individual even rows; an odd row common bus line connected with said odd row common electrode lines; an even row common bus line connected with said even row common electrode lines; and drive voltage applying means for applying voltage signal waveforms between said pixel electrodes and said common electrodes, wherein said pixel electrodes and said common electrodes are so arranged as to apply electric fields having components parallel with the substrate plane between said pixel electrodes and said common electrodes by said drive voltage applying means, wherein said parallel electric field components are generated to drive the liquid crystal between said pixel electrodes and said common electrodes by applying voltage waveforms varying with video data to said pixel electrodes and pulse waveforms having binary amplitude levels to said common electrodes, wherein the waveforms applied to said odd row common electrode lines and said even row common electrode lines by said drive voltage applying means have inverted phases to each other;

wherein said drive voltage applying means includes the common electrode driving unit for outputting common electrode driving signals for driving said common electrode lines of said thin film transistor liquid crystal display panel, wherein said common electrode driving unit includes differential signal superposing means for generating a differential signal and superposing it upon said common electrode driving signals; and wherein said common electrode driving unit includes a feedback amplifier, and wherein said differential signal superposing means is an integrator including a wiring resistor of the signal line from the output of said common electrode driving unit to said thin film transistor liquid crystal display panel, and a wiring resistor of said common electrode line, and capacitors of a stray capacitor of the signal line from the output of said common electrode driving unit to said thin film transistor liquid crystal display panel and a stray capacitor of said common electrode line, inserted into the feedback loop of the feedback amplifier.

11. A liquid crystal device according to claim 10, wherein said differential signal superposing means generates a differential signal for a period longer than at least two times of the horizontal interval and superposes said differential signal upon said common electrode driving signals.

\* \* \* \* \*